(12) United States Patent
Liu et al.

(10) Patent No.: US 11,683,827 B2
(45) Date of Patent: Jun. 20, 2023

(54) METHOD AND DEVICE IN NODE USED FOR WIRELESS COMMUNICATION

(71) Applicants: Jin Liu, Shanghai (CN); Xiaobo Zhang, Shanghai (CN)

(72) Inventors: Jin Liu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 265 days.

(21) Appl. No.: 16/896,211

(22) Filed: Jun. 9, 2020

(65) Prior Publication Data

US 2020/0404678 A1    Dec. 24, 2020

(30) Foreign Application Priority Data

Jun. 18, 2019  (CN) .......................... 201910525161.5

(51) Int. Cl.
*H04W 72/542* (2023.01)
*H04W 24/08* (2009.01)
*H04W 72/51* (2023.01)

(52) U.S. Cl.
CPC ......... *H04W 72/542* (2023.01); *H04W 24/08* (2013.01); *H04W 72/51* (2023.01)

(58) Field of Classification Search
CPC . H04W 84/005; H04W 72/085; H04W 24/08; H04W 72/048; H04W 72/542; H04W 72/51; H04W 4/40; H04W 72/0446; H04W 72/0453; H04L 5/0005
See application file for complete search history.

(56) References Cited

U.S. PATENT DOCUMENTS

2010/0246559 A1*  9/2010  Ogawa .................. H04W 72/23
                                                              370/345

* cited by examiner

*Primary Examiner* — Ayanah S George

(57) ABSTRACT

The present disclosure provides a method and a device in a node used for wireless communication. A first node receives a first signal to determine a first channel quality; determines a first speed; and determines whether a first resource pool comprises a first time-frequency resource block; selects a target time-frequency resource block from the first resource pool; and transmits a second signal in the target time-frequency resource block; herein, the first speed is a speed of mobility of the first node; the first resource pool comprises multiple time-frequency resource blocks, whether the first resource pool comprises the first time-frequency resource block is dependent on the first speed. The present disclosure takes into account the speed of mobility of a user in resources sensing, thus ensuring that the channel quality which autonomously selects resources meets the current transmission requirements.

16 Claims, 14 Drawing Sheets

METHOD AND DEVICE IN NODE USED FOR WIRELESS COMMUNICATION

CROSS REFERENCE TO RELATED APPLICATIONS

This application claims the priority benefit of Chinese Patent Application No. 201910525161.5, filed on Jun. 18, 2019, the full disclosure of which is incorporated herein by reference.

BACKGROUND

Technical Field

The present disclosure relates to transmission methods and devices in wireless communication systems, and in particular to a sidelink-related transmission scheme and device in wireless communications.

Related Art

Application scenarios of future wireless communication systems are becoming increasingly diversified, and different application scenarios have different performance demands on systems. In order to meet different performance requirements of various application scenarios, it was decided at the 3rd Generation Partner Project (3GPP) Radio Access Network (RAN) #72 plenary session that a study on New Radio (NR), or what is called Fifth Generation (5G), shall be conducted. The work item of NR was approved at the 3GPP RAN #75 plenary session to standardize NR.

In response to rapidly growing Vehicle-to-Everything (V2X) traffic, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. At 3GPP RAN #80 Plenary Session, the technical Study Item (SI) of NR V2X was initiated. Later at the first AdHoc conference of RANI 2019, it was agreed that the pathloss between a transmitter and a receiver in a V2X pair will be taken as reference when calculating the V2X transmitting power.

SUMMARY

The speed of mobility of UE is not considered as a factor of resources sensing under the working mode of User's autonomous selection of resources in a traditional LTE V2X system. Actually, when a User and another User move towards each other, the former one senses the channel quality of the latter one and then makes a sensing determination, a drastic change will be felt in the channel condition between these two Users due to their fast relative speed of mobility, therefore, a determination made based on a previous channel quality may not be applicable to the current signal transmission.

To address the above problem, the present disclosure provides a solution for sidelink resource sensing, which is an effective response to faster relative speed of mobility between UEs in a V2X system. It should be noted that the embodiments of a User Equipment (UE) in the present disclosure and characteristics in the embodiments may be applied to a base station if there is no conflict, and vice versa. And the embodiments of the present disclosure and the characteristics in the embodiments may be mutually combined if no conflict is incurred. Further, though originally targeted at single-carrier communications, the present disclosure is also applicable to multi-carrier communications; the present disclosure, though originally targeted at single-antenna communications, can also be applied to multi-antenna communications.

The present disclosure provides a method in a first node for wireless communications, comprising:

receiving a first signal so as to determine a first channel quality;

determining a first speed;

determining whether a first resource pool comprises a first time-frequency resource block;

selecting a target time-frequency resource block from a first resource pool; and transmitting a second signal in the target time-frequency resource block;

herein, the first speed is a speed of mobility of the first node; the first resource pool comprises multiple time-frequency resource blocks, and whether the first resource pool comprises the first time-frequency resource block is dependent on the first speed.

In one embodiment, a problem to be solved in the present disclosure is that under a working mode of autonomous selection of resources highly reliant on channel measurement, when the relative speed of mobility between UEs is fast, a time-frequency resource sensed by the channel is not suitable for present transmission.

In one embodiment, the method in the present disclosure is to include an inter-user speed of mobility into consideration of resources sensing.

In one embodiment, the above method is characterized in determining a first speed by calculating a moving user's change of position.

In one embodiment, the above method is characterized in associating a first threshold which determines channel quality in resources sensing with the first speed.

In one embodiment, the above method is characterized in introducing a second threshold which determines a speed of mobility, thereby associating the method of resources sensing with the second threshold.

In one embodiment, the above method is advantageous in that a speed of mobility of a user is taken into account in resources sensing, thereby ensuring a channel quality that autonomous selects resources will meet the present transmission requirements.

According to one aspect of the present disclosure, the above method is characterized in comprising:

receiving two first-type signals, and the two first-type signals respectively indicating two positions;

herein, time-domain resources occupied by the two first-type signals are orthogonal; the first speed is related to a difference between two distances, the speed of mobility of the first node is a speed of mobility between the first node and a transmitter of the first signal; the two distances are respectively distances from the two positions to two reference positions.

According to one aspect of the present disclosure, the above method is characterized in comprising:

receiving a second-type signal, and determining the two reference positions according to the second-type signal;

herein, a transmitted of the second-type signal and the transmitter of the first signal are non-co-located.

According to one aspect of the present disclosure, the above method is characterized in comprising:

when the first channel quality is lower than a first threshold, the first receiver determines that the first resource pool comprises the first time-frequency resource block;

when the first channel quality is higher than a first threshold, the first receiver determines that the first resource pool does not comprise the first time-frequency resource block;

herein, the first threshold is related to the first speed.

According to one aspect of the present disclosure, the above method is characterized in comprising:

when the first channel quality is lower than a first threshold and the first speed is lower than a second threshold, it is determined that the first resource pool comprises the first time-frequency resource block;

when the first channel quality is not lower than a first threshold or the first speed is not lower than a second threshold, it is determined that the first resource pool does not comprise the first time-frequency resource block.

According to one aspect of the present disclosure, the above method is characterized in comprising:

measuring Q second-type channel parameters for Q time-frequency resource blocks respectively, Q being a positive integer greater than 1;

herein, the first time-frequency resource block is one of the Q time-frequency resource blocks, and a second-type channel parameter measured for the first time-frequency resource block is a smallest value among the Q second-type channel parameters.

According to one aspect of the present disclosure, the above method is characterized in that the first node is a UE.

According to one aspect of the present disclosure, the above method is characterized in that the first node is a base station.

According to one aspect of the present disclosure, the above method is characterized in that the first node is a relay node.

The present disclosure provides a method in a second node for wireless communications, comprising:

transmitting a first signal;

herein, the first signal is used for determining a first channel quality; a first speed is a speed of mobility of the first node; a first resource pool comprises multiple time-frequency resource blocks, and whether the first resource pool comprises a first time-frequency resource block is dependent on the first speed; a target time-frequency resource block is selected from the first resource pool; the target time-frequency resource block is used for transmitting a second signal.

The present disclosure provides a method in a second node for wireless communications, comprising:

transmitting a first signal; and receiving a second signal in the target time-frequency resource block;

herein, the first signal is used for determining a first channel quality; a first speed is a speed of mobility of the first node; a first resource pool comprises multiple time-frequency resource blocks, and whether the first resource pool comprises a first time-frequency resource block is dependent on the first speed.

According to one aspect of the present disclosure, the above method is characterized in comprising:

transmitting two first-type signals, and the two first-type signals respectively indicating two positions;

herein, time-domain resources occupied by the two first-type signals are orthogonal; the first speed is related to a difference between two distances, the speed of mobility of the first node is a speed of mobility between the first node and a transmitter of the first signal; the two distances are respectively distances from the two positions to two reference positions.

According to one aspect of the present disclosure, the above method is characterized in that a second-type signal is used for determining the two reference positions; a transmitter of the second-type signal and the transmitter of the first signal are non-co-located.

According to one aspect of the present disclosure, the above method is characterized in that when the first channel quality is lower than a first threshold, it is determined that the first resource pool comprises the first time-frequency resource block; when the first channel quality is higher than a first threshold, it is determined that the first resource pool does not comprise the first time-frequency resource block; the first threshold is related to the first speed.

According to one aspect of the present disclosure, the above method is characterized in that when the first channel quality is lower than a first threshold and the first speed is lower than a second threshold, it is determined that the first resource pool comprises the first time-frequency resource block; when the first channel quality is not lower than a first threshold or the first speed is not lower than a second threshold, it is determined that the first resource pool does not comprise the first time-frequency resource block.

According to one aspect of the present disclosure, the above method is characterized in that Q second-type channel parameters are respectively measured for Q time-frequency resource blocks; the first time-frequency resource block is one of the Q time-frequency resource blocks; and a second-type channel parameter measured for the first time-frequency resource block is a smallest value among the Q second-type channel parameters, Q being a positive integer greater than 1.

According to one aspect of the present disclosure, the above method is characterized in that the second node is a UE.

According to one aspect of the present disclosure, the above method is characterized in that the second node is a base station.

According to one aspect of the present disclosure, the above method is characterized in that the second node is a relay node.

The present disclosure provides a first node for wireless communications, comprising:

a first receiver, receiving a first signal so as to determine a first channel quality;

wherein the first receiver determines a first speed;

and the first receiver determines whether a first resource pool comprises a first time-frequency resource block;

a first transmitter, selecting a target time-frequency resource block from a first resource pool;

wherein the first transmitter transmits a second signal in the target time-frequency resource block;

herein, the first speed is a speed of mobility of the first node; the first resource pool comprises multiple time-frequency resource blocks, and whether the first resource pool comprises the first time-frequency resource block is dependent on the first speed.

The present disclosure provides a second node for wireless communications, comprising:

a second transmitter, transmitting a first signal;

herein, the first signal is used for determining a first channel quality; a first speed is a speed of mobility of the first node; a first resource pool comprises multiple time-frequency resource blocks, and whether the first resource pool comprises a first time-frequency resource block is dependent on the first speed; a target time-frequency resource block is selected from the first resource pool; the target time-frequency resource block is used for transmitting a second signal.

The present disclosure provides a second node for wireless communications, comprising:

a second transmitter, transmitting a first signal; and a second receiver, receiving a second signal in the target time-frequency resource block.

herein, the first signal is used for determining a first channel quality; a first speed is a speed of mobility of the first node; a first resource pool comprises multiple time-frequency resource blocks, and whether the first resource pool comprises a first time-frequency resource block is dependent on the first speed; a target time-frequency resource block is selected from the first resource pool.

In one embodiment, the present disclosure has the following advantages:

The present disclosure includes the speed of mobility between UEs as a factor of consideration of resource sensing.

The present disclosure determines the first speed by calculating a displacement of a moving UE from its previous position.

The present disclosure associates a first threshold used to determine channel quality in resource sensing with the first speed.

The present disclosure introduces a second threshold for determining a speed of mobility, thereby associating the method of resource sensing with the second threshold.

The resource sensing process in the present disclosure takes the UE's speed of mobility into account so as to ensure the channel quality which selects resources autonomously will meet the current transmission requirements.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
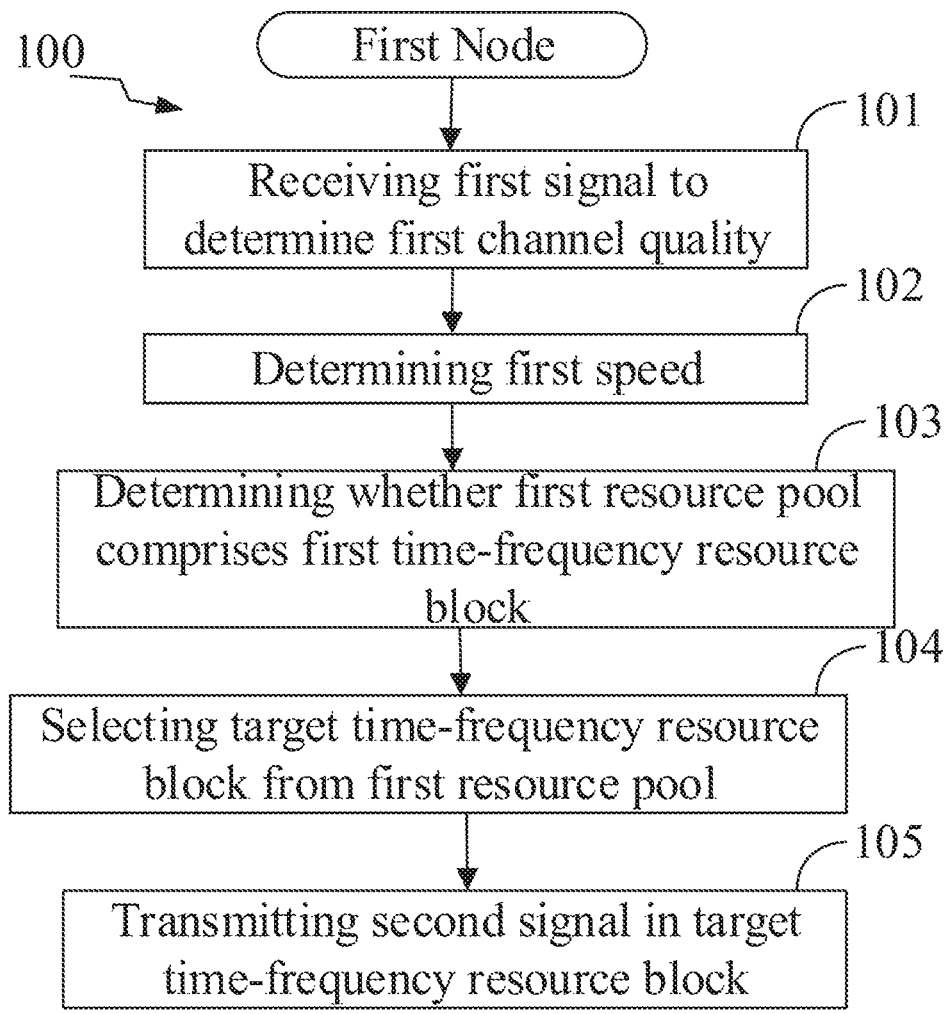
FIG. 1 illustrates a flowchart of processing of a first node according to one embodiment of the present disclosure.

Embodiment 1 illustrates a flowchart of processing of a first node, as shown in FIG. 1. In FIG. 1, each box represents a step. In Embodiment 1, the first node of the present disclosure first takes step 101 to receive a first signal so as to determine a first channel quality; and takes step 102 to determine a first speed; and then takes step 103 to determine whether a first resource pool comprises a first time-frequency resource block; and takes step 104 to select a target time-frequency resource block from the first resource pool; and finally takes step 105 to transmit a second signal in the target time-frequency resource block; the first speed is a speed of mobility of the first node; the first resource pool comprises multiple time-frequency resource blocks, and whether the first resource pool comprises the first time-frequency resource block is dependent on the first speed.

In one embodiment, the first signal is transmitted through a Physical Sidelink Control Channel (PSCCH).

In one embodiment, the first signal is transmitted through a Physical Sidelink Shared Channel (PSSCH).

In one embodiment, the first signal is transmitted through a PSCCH and a PSSCH.

In one embodiment, the first signal is transmitted through a Physical Downlink Control Channel (PDCCH).

In one embodiment, the first signal is transmitted through a Narrowband Physical Downlink Control Channel (NPDCCH).

In one embodiment, the first signal is broadcast.

In one embodiment, the first signal is groupcast.

In one embodiment, the first signal is unicast.

In one embodiment, the first signal is cell-specific.

In one embodiment, the first signal is UE-specific.

In one embodiment, the first signal comprises a Reference Signal (RS).

In one embodiment, the first signal comprises a Demodulation Reference Signal (DMRS).

In one embodiment, the first signal comprises a Channel State Information-Reference Signal (CSI-RS).

In one embodiment, the first signal comprises a PSSCH DMRS, i.e., a DMRS for demodulating a PSSCH.

In one embodiment, the first signal comprises a PSCCH DMRS, i.e., a DMRS for demodulating a PSCCH.

In one embodiment, the first signal comprises a Sidelink DMRS (SL DMRS).

In one embodiment, the first signal comprises a Sidelink CSI-RS (SL CSI-RS).

In one embodiment, the first signal is generated by a pseudo-random sequence.

In one embodiment, the first signal is generated by a Gold sequence.

In one embodiment, the first signal is generated by a M-sequence.

In one embodiment, the first signal is generated by a Zadeoff-Chu sequence.

In one embodiment, for how the first signal is generated, refer to 3GPP TS38.211, section 7.4.1.5.

In one embodiment, the first signal comprises a first bit block, and the first bit block comprises a positive integer number of sequentially arranged bits.

In one embodiment, the first bit block comprises a positive integer number of Code Block(s) (CB).

In one embodiment, the first bit block comprises a positive integer number of Code Block Group(s) (CBG).

In one embodiment, the first bit block comprises a Transport Block (TB).

In one embodiment, the first bit block is obtained from a TB going through TB-level Cyclic Redundancy Check (CRC) Attachment.

In one embodiment, the first bit block is one of CBs obtained from a TB sequentially going through TB-level CRC Attachment, Code Block Segmentation and CB-level CRC Attachment.

In one embodiment, the first signal is obtained from all or part of bits in the first bit block sequentially going through TB-level CRC Attachment, Code Block Segmentation and CB-level CRC Attachment, Channel Coding, Rate Matching, Code Block Concatenation, scrambling, Modulation, Layer Mapping, Antenna Port Mapping, Mapping to Physical Resource Blocks, and Baseband Signal Generation, as well as Modulation and Upconversion.

In one embodiment, the first signal is an output from the first bit block sequentially going through a Modulation Mapper, a Layer Mapper, Precoding, a Resource Element Mapper and Multicarrier Symbol Generation.

In one embodiment, the channel coding is based on a polar code.

In one embodiment, the channel coding is based on a Low-density Parity-Check (LDPC) code.

In one embodiment, only the first bit block is used for generating the first signal.

In one embodiment, there is other bit block than the first bit block used for generating the first signal.

In one embodiment, the first bit block comprises data transmitted on a Sidelink Shared Channel (SL-SCH).

In one embodiment, the first bit block comprises data transmitted on a Sidelink Broadcast Channel (SL-BCH).

In one embodiment, the first bit block comprises data transmitted on a Downlink Shared Channel (DL-SCH).

In one embodiment, the first bit block comprises data transmitted on an Uplink Shared Channel (UL-SCH).

In one embodiment, the first signal comprises one or more fields in a physical (PHY) layer.

In one embodiment, the first signal comprises one or more fields in a piece of Sidelink Control Information (SCI).

In one embodiment, the first signal comprises one or more fields in a piece of Downlink Control Information (DCI).

In one embodiment, the first signal comprises all or part of a Multimedia Access Control (MAC) layer signaling.

In one embodiment, the first signal comprises one or more fields in a MAC Control Element (CE).

In one embodiment, the first signal comprises all or part of a higher layer signaling.

In one embodiment, the first signal comprises all or part of a Radio Resource Control (RRC) layer signaling.

In one embodiment, the first signal comprises one or more fields in an RRC Information Element (IE).

In one embodiment, the first signal comprises T first-type sub-signal(s), and the T first-type sub-signal(s) is(are) respectively transmitted on T first-type time-frequency resource block(s), T being a positive integer.

In one embodiment, the T is a multiple of 10.

In one embodiment, any of the T first-type sub-signal(s) is an RS.

In one embodiment, any of the T first-type sub-signal(s) is a CSI-RS.

In one embodiment, any of the T first-type sub-signal(s) is a DMRS.

In one embodiment, any of the T first-type sub-signal(s) is a Synchronization Signal (SS).

In one embodiment, any of the T first-type sub-signal(s) is a Primary Sidelink Synchronization Signal (PSSS).

In one embodiment, any of the T first-type sub-signal(s) is a Secondary Sidelink Synchronization Signal (SSSS).

In one embodiment, any of the T first-type time-frequency resource block(s) comprises a positive integer number of time-frequency resource unit(s).

In one embodiment, the T first-type time-frequency resource blocks are orthogonal in time domain.

In one embodiment, the T first-type time-frequency resource blocks are orthogonal in frequency domain.

In one embodiment, the T first-type time-frequency resource blocks are orthogonal in time domain and are the same in frequency domain.

In one embodiment, the T first-type time-frequency resource blocks are orthogonal in frequency domain and are the same in time domain.

In one embodiment, a first sub-time-frequency-resource-block and a second sub-time-frequency-resource-block are any two different first-type time-frequency resource blocks among the T first-type time-frequency resource blocks.

In one embodiment, a time-domain resource unit occupied by the first sub-time-frequency-resource-block and a time-domain resource unit occupied by the second sub-time-frequency-resource-block are orthogonal.

In one embodiment, a frequency-domain resource unit occupied by the first sub-time-frequency-resource-block and a frequency-domain resource unit occupied by the second sub-time-frequency-resource-block are orthogonal.

In one embodiment, a time-domain resource unit occupied by the first sub-time-frequency-resource-block and a time-domain resource unit occupied by the second sub-time-frequency-resource-block are orthogonal; while a frequency-domain resource unit occupied by the first sub time-frequency resource block and a frequency-domain resource unit occupied by the second sub time-frequency resource block are the same.

In one embodiment, a frequency-domain resource unit occupied by the first sub-time-frequency-resource-block and a frequency-domain resource unit occupied by the second sub-time-frequency-resource-block are orthogonal; while a time-domain resource unit occupied by the first sub-time-frequency-resource-block and a time-domain resource unit occupied by the second sub-time-frequency-resource-block are the same.

In one embodiment, any first-type time-frequency resource block of the T first-type time-frequency resource blocks comprises a PSSCH.

In one embodiment, any first-type time-frequency resource block of the T first-type time-frequency resource blocks comprises a PSCCH.

In one embodiment, any first-type time-frequency resource block of the T first-type time-frequency resource blocks comprises a PSCCH and a PSSCH.

In one embodiment, the first channel quality is a receiving power of the first signal.

In one embodiment, the first channel quality is a total receiving power of the first signal.

In one embodiment, the first channel quality is an average receiving power of the first signal.

In one embodiment, the first channel quality is an average receiving power of the first signal on a subcarrier.

In one embodiment, the first channel quality is a linear average value of a receiving power of the first signal in time domain.

In one embodiment, the first channel quality is a linear average value of a receiving power of the first signal in frequency domain.

In one embodiment, the first channel quality is a linear average value of receiving powers of the T first-type sub-signals.

In one embodiment, the first channel quality is an average receiving power of an RS comprised by the first signal.

In one embodiment, the first channel quality is a linear average value of a receiving power of an RS comprised by the first signal in time domain.

In one embodiment, the first channel quality is a linear average value of a receiving power of an RS comprised by the first signal in frequency domain.

In one embodiment, the first channel quality comprises a Reference Signal Receiving Power (RSRP).

In one embodiment, the first channel quality is an average power of all signals received in the T first-type time-frequency resource blocks.

In one embodiment, signals received in the T first-type time-frequency resource blocks include RS, data signal, jamming signal and noise signal.

In one embodiment, the first channel quality comprises Received Signal Strength Indication (RSSI).

In one embodiment, the first channel quality comprises Reference Signal Receiving Quality (RSRQ).

In one embodiment, the first channel quality comprises Signal to Noise Ratio (SNR).

In one embodiment, the first channel quality comprises Signal to Interference plus Noise Ratio (SINR).

In one embodiment, the first channel quality comprises L1-RSRP.

In one embodiment, the first channel quality comprises L3-RSRP.

In one embodiment, the first channel quality comprises SL-RSRP.

In one embodiment, the first channel quality comprises PSSCH-RSRP.

In one embodiment, the first channel quality comprises PSCCH-RSRP.

In one embodiment, the first channel quality is measured by dBm.

In one embodiment, the first channel quality is measured by dB.

In one embodiment, the first channel quality is measured by W.

In one embodiment, the first channel quality is measured by mW.

In one embodiment, the action of receiving a first signal includes receiving based on blind detection, namely, the first node receives the first signal in the first monitoring window and performs decoding, if the decoding is determined as correct by a CRC bit, it is determined that the first signal is correctly received in the first monitoring window; otherwise, it is determined that the first signal is not correctly received in the first monitoring window.

In one embodiment, the first monitoring window comprises a positive integer number of time-domain resource unit(s).

In one embodiment, the first monitoring window comprises a positive integer number of time-frequency resource unit(s).

In one embodiment, the T first-type time-frequency resource blocks belong to the first monitoring window.

In one embodiment, the first monitoring window is prior to the first time-frequency resource block.

In one embodiment, an end of the first monitoring window is no later than a start time of the first time-frequency resource block.

In one embodiment, the action of receiving a first signal includes receiving based on coherent detection, namely, the first node performs coherent reception on a radio signal in the first monitoring window with an RS sequence of the first signal and then measures energy of a signal acquired from the coherent reception; if the energy of the signal acquired from the coherent reception is greater than a first given threshold, it is determined that the first signal is correctly received in the first monitoring window; otherwise it is determined that the first signal is not correctly received in the first monitoring window.

In one embodiment, the action of receiving a first signal includes receiving based on energy detection, namely, the first node senses energy of a radio signal in the first monitoring window and averages in time to acquire a received energy; if the received energy is greater than a second given threshold, it is then determined that the first signal is correctly received in the first monitoring window; otherwise it is determined that the first signal is not correctly received in the first monitoring window.

In one embodiment, the action of receiving a first signal so as to determine a first channel quality includes signaling-based energy detection, which means that the first node receives the first target signaling in the first monitoring window, and, on the condition that the first target signaling is correctly received, senses energy of the first signal and averages in frequency domain so as to acquire a first channel quality.

In one embodiment, the action of receiving a first signal so as to determine a first channel quality includes signaling-based energy detection, which means that the first node receives the first target signaling in the first monitoring window, and, on the condition that the first target signaling is correctly received, senses energy of the first signal and averages in time domain so as to acquire a first channel quality.

In one embodiment, the first target signaling is associated with the first signal.

In one embodiment, the first target signaling is used for indicating the first signal.

In one embodiment, the first target signaling is used for scheduling the first signal.

In one embodiment, the first target signaling indicates a time-frequency resource unit occupied by the first signal.

In one embodiment, the first target signaling indicates a transmission format of the first signal.

In one embodiment, the transmission format comprises Rate-matching, Transport Block Size (TB S) scaling.

In one embodiment, the transmission format comprises puncturing and non-TBS scaling.

In one embodiment, the first target signaling indicates a DMRS employed by the first signal.

In one embodiment, the first target signaling indicates an MCS employed by the first signal.

In one embodiment, the first target signaling indicates an Antenna Port (AP) for the first signal.

In one embodiment, the first target signaling comprises SCI.

In one embodiment, the action of receiving a first signal so as to determine a first channel quality includes signaling-based energy detection, which means that the first node receives the T first-type sub-signalings in the first monitoring window, of which each first-type sub-signaling is correctly received, and senses energy of the T first-type sub-signals and averages in time domain, thereby acquiring a first channel quality.

In one embodiment, the action of receiving a first signal so as to determine a first channel quality includes signaling-based energy detection, which means that the first node receives the T first-type sub-signalings in the first monitoring window, of which each first-type sub-signaling is correctly received, and senses energy of the T first-type sub-signals and averages in frequency domain, thereby acquiring a first channel quality.

In one embodiment, the action of receiving a first signal so as to determine a first channel quality includes signaling-based energy detection, which means that the first node receives the T first-type sub-signalings in the first monitoring window, of which each first-type sub-signaling is correctly received, and senses energy of the T first-type sub-signals and filters in a physical layer, thereby acquiring a first channel quality.

In one embodiment, the action of receiving a first signal so as to determine a first channel quality includes signaling-based energy detection, which means that the first node receives the T first-type sub-signalings in the first monitoring window, of which each first-type sub-signaling is correctly received, and senses energy of the T first-type sub-signals and filters in a higher layer, thereby acquiring a first channel quality.

In one embodiment, the T first-type sub-signalings are respectively used for indicating the T first-type sub-signals.

In one embodiment, the first speed is a speed of mobility of the first node, and the speed of mobility of the first node comprises an absolute speed of mobility of the first node.

In one embodiment, the first speed is a speed of mobility of the first node, and the speed of mobility of the first node comprises a speed of mobility between the first node and a transmitter of the first signal.

In one embodiment, the first speed is a speed of mobility of the first node, and the speed of mobility of the first node comprises a relative speed of mobility between the first node and a transmitter of the first signal.

In one embodiment, the absolute speed of mobility of the first node refers to a traveling speed of the first node.

In one embodiment, the absolute speed of mobility of the first node refers to a speed of mobility between the first node and a third communication node.

In one subembodiment of the above embodiment, the third communication node is fixed.

In one subembodiment of the above embodiment, the position of the third communication node is fixed.

In one subembodiment of the above embodiment, the third communication node is fixed within a radio frame.

In one subembodiment of the above embodiment, the third communication node comprises a base station.

In one subembodiment of the above embodiment, the third communication node comprises a satellite.

In one subembodiment of the above embodiment, the third communication node comprises a relay.

In one subembodiment of the above embodiment, the third communication node comprises a UE.

In one subembodiment of the above embodiment, the third communication node does not comprise the transmitter of the first signal.

In one embodiment, an absolute speed of mobility of the first node is configured by a higher layer of the first node.

In one embodiment, an absolute speed of mobility of the first node is acquired through GPS.

In one embodiment, an absolute speed of mobility of the first node is acquired through a cell's switching of speed.

In one embodiment, the first speed is a speed of mobility of the first node, and the speed of mobility of the first node comprises a speed of mobility of the first node relative to a transmitter of the first signal.

In one embodiment, the first speed is a speed of mobility of the first node, and the speed of mobility of the first node comprises a relative speed of mobility between the first node and a transmitter of the first signal.

In one embodiment, the first speed is a speed of mobility of the first node, and the speed of mobility of the first node comprises a relative speed of mobility of the first node relative to a transmitter of the first signal.

In one embodiment, the first speed is linear with an absolute speed of mobility of the first node.

In one embodiment, the first speed is linear with a speed of mobility of a transmitter of the first node.

In one embodiment, the first speed is linear with a speed of mobility between the first node and a transmitter of the first signal.

In one embodiment, the first speed is linear with a speed of mobility of the first node and a speed of mobility of a transmitter of the first signal.

In one embodiment, the first speed is equal to a sum of a speed of mobility of the first node and a speed of mobility of a transmitter of the first signal.

In one embodiment, the first speed is equal to a difference between a speed of mobility of the first node and a speed of mobility of a transmitter of the first signal.

In one embodiment, the first speed is equal to a difference between a speed of mobility of a transmitter of the first signal and a difference between a speed of mobility of the first node.

In one embodiment, the first speed is a difference between an absolute speed of mobility of the first node and an absolute speed of mobility of a transmitter of the first signal.

In one embodiment, the first speed is an absolute value of a difference between an absolute speed of mobility of the first node and an absolute speed of mobility of a transmitter of the first signal.

In one embodiment, the first speed is a speed of mobility between the first node and a serving cell of the first node.

In one embodiment, the first speed is a speed of mobility between the first node and a serving base station of the first node.

In one embodiment, the first speed is a relative speed of mobility of the first node relative to a serving cell of the first node.

In one embodiment, the first speed is a speed of mobility between the first node and a fourth communication node.

In one embodiment, the first speed is a speed of mobility of the first node relative to a fourth communication node.

In one subembodiment of the above embodiment, the fourth communication node comprises a base station.

In one subembodiment of the above embodiment, the fourth communication node comprises a relay.

In one subembodiment of the above embodiment, the fourth communication node comprises a satellite.

In one subembodiment of the above embodiment, the fourth communication node comprises a UE.

In one subembodiment of the above embodiment, the fourth communication node is mobile.

In one subembodiment of the above embodiment, the position of the fourth communication node is varied.

In one subembodiment of the above embodiment, the fourth communication node comprises the transmitter of the first signal.

In one embodiment, the first speed is a distance of travelling per unit time.

In one embodiment, the first speed is a number of zones switched per unit time.

In one embodiment, the first speed is measured by km/h.
In one embodiment, the first speed is measured by m/h.
In one embodiment, the first speed is measured by m/s.
In one embodiment, the first speed is measured by mile/h.
In one embodiment, the first speed is measured by the number of zones per second.

In one embodiment, the first speed is measured by the number of zones per hour.

In one embodiment, a speed of mobility between the first node and a transmitter of the first signal, which is the first speed, is determined.

In one embodiment, the first channel quality and the first speed are used for determining whether the first resource pool comprises the first time-frequency resource block.

Embodiment 2

Figure 2:
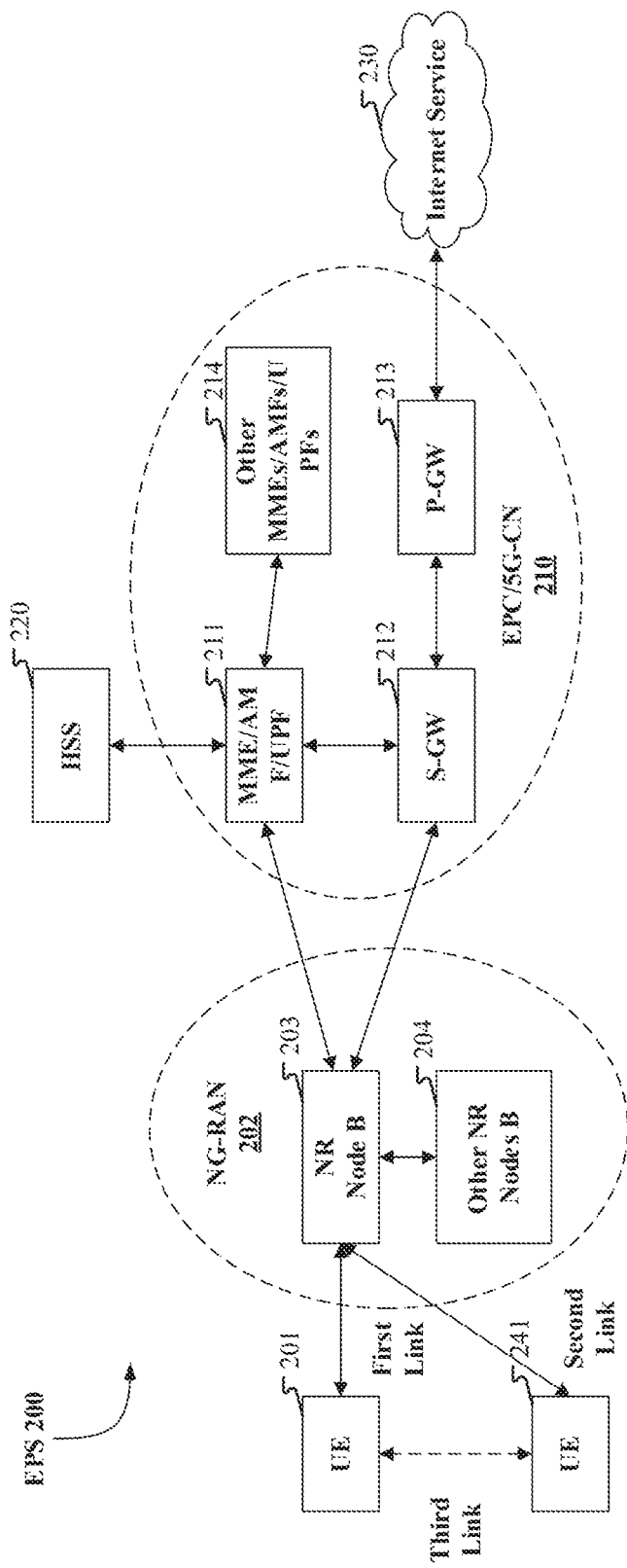
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of Long-Term Evolution (LTE), Long-Term Evolution Advanced (LTE-A) and 5G NR systems. The 5G NR or LTE network architecture 200 may be called an Evolved Packet System (EPS) 200 or other applicable terms, which may comprise one or more UEs 201, as well as a UE 241 in sidelink communication with the UE 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPS), multi-media devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the first node of the present disclosure comprises the UE 201.

In one embodiment, the second node of the present disclosure comprises the UE 241.

In one embodiment, the UE of the present disclosure comprises the UE 201.

In one embodiment, the UE of the present disclosure comprises the UE 241.

In one embodiment, the UE 201 supports sidelink transmission.

In one embodiment, the UE 201 supports a PC5 interface.
In one embodiment, the UE 241 supports sidelink transmission.

In one embodiment, the UE 241 supports a PC5 interface.
In one embodiment, a transmitter of the first signal in the present disclosure comprises the UE 241.

In one embodiment, a receiver of the first signal in the present disclosure comprises the UE 201.

In one embodiment, a transmitter of the second-type signal in the present disclosure does not comprise the UE 241.

In one embodiment, a receiver of the second-type signal in the present disclosure comprises the UE 201.

In one embodiment, a transmitter of the two first-type signals in the present disclosure comprises the UE 241.

In one embodiment, a receiver of the two first-type signals in the present disclosure comprises the UE 201.

In one embodiment, a transmitter of the second signal in the present disclosure comprises the UE 201.

In one embodiment, a receiver of the second signal in the present disclosure comprises the UE 241.

In one embodiment, a receiver of the second signal in the present disclosure does not comprise the UE 241.

Embodiment 3

Figure 3:
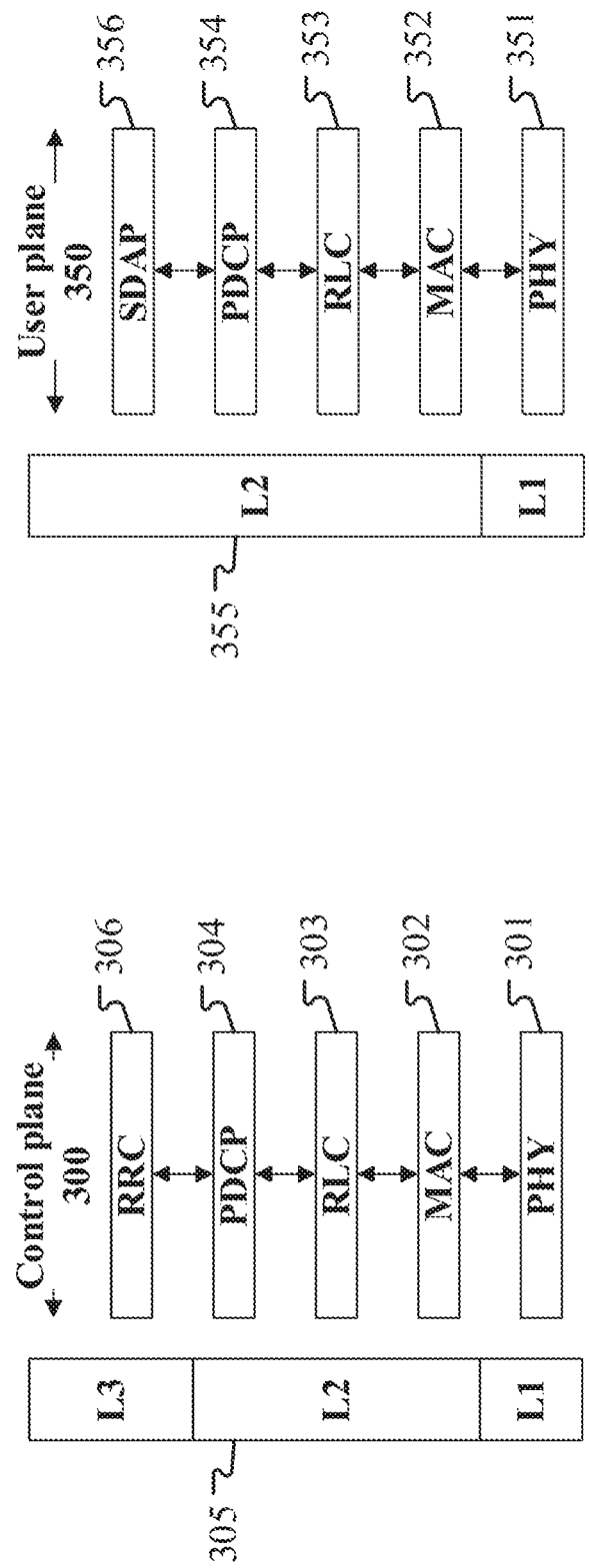
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3. FIG. 3 is a schematic diagram illustrating a radio protocol architecture of a user plane 350 and a control plane 300. In FIG. 3, the radio protocol architecture for a control plane 300 between a first communication node (UE, gNB or RSU in V2X) and a second communication node (gNB, UE, or RSU in V2X), or between two UEs is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between a first communication node and a second communication node, and between two UEs via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing between varied radio bearers and logical channels. The PDCP sublayer 304 also provides security by encrypting a packet and provides support for the handover of first communication node between second communication nodes. The RLC sublayer 303 provides segmentation and reassembling of a higher-layer packet, retransmission of a lost packet, and reordering of a packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, a Radio Resource Control (RRC) sublayer 306 in layer 3 (L3 layer) is responsible for acquiring radio resources (i.e., radio bearer) and configuring the lower layer using an RRC signaling between the second communication node and the first communication node. A radio protocol architecture for the user plane 350 comprises a layer 1 (L1) and a layer 2 (L2). In the user plane 350, the radio protocol architecture used for the first communication node and the second communication node applied in a physical layer 351, a PDCP sublayer 354 in the L2 layer 355, a RLC sublayer 353 in the L2 layer 355 and a MAC sublayer 352 in the L2 layer 355 is almost the same as that applied in counterpart layers and sublayers in the control plane 300. But the PDCP sublayer 354 also provides header compression for a higher-layer packet to reduce radio transmission overhead. The L2 layer 355 in the user plane 350 also comprises a Service Data Adaptation Protocol (SDAP) sublayer 356, and the SDAP sublayer 356 is in charge of the mapping from QoS stream to Data Radio Bearer (DRB) as a way to support diverse traffic. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signal of the present disclosure is generated by the PHY 351.

In one embodiment, the second-type signal of the present disclosure is generated by the PHY 351.

In one embodiment, the second-type signal of the present disclosure is generated by the MAC sublayer 352.

In one embodiment, the second-type signal of the present disclosure is generated by the RRC sublayer 306.

In one embodiment, the two second-type signals of the present disclosure are respectively generated by the PHY 351.

In one embodiment, the two second-type signals of the present disclosure are respectively generated by the MAC sublayer 352.

In one embodiment, the two second-type signals of the present disclosure are respectively generated by the RRC sublayer 306.

In one embodiment, the second signal of the present disclosure is generated by the SDAP sublayer 356.

In one embodiment, the second signal of the present disclosure is generated by the RRC sublayer 306.

In one embodiment, the second signal of the present disclosure is transmitted from the MAC sublayer 352 to the PHY 351.

Embodiment 4

Figure 4:
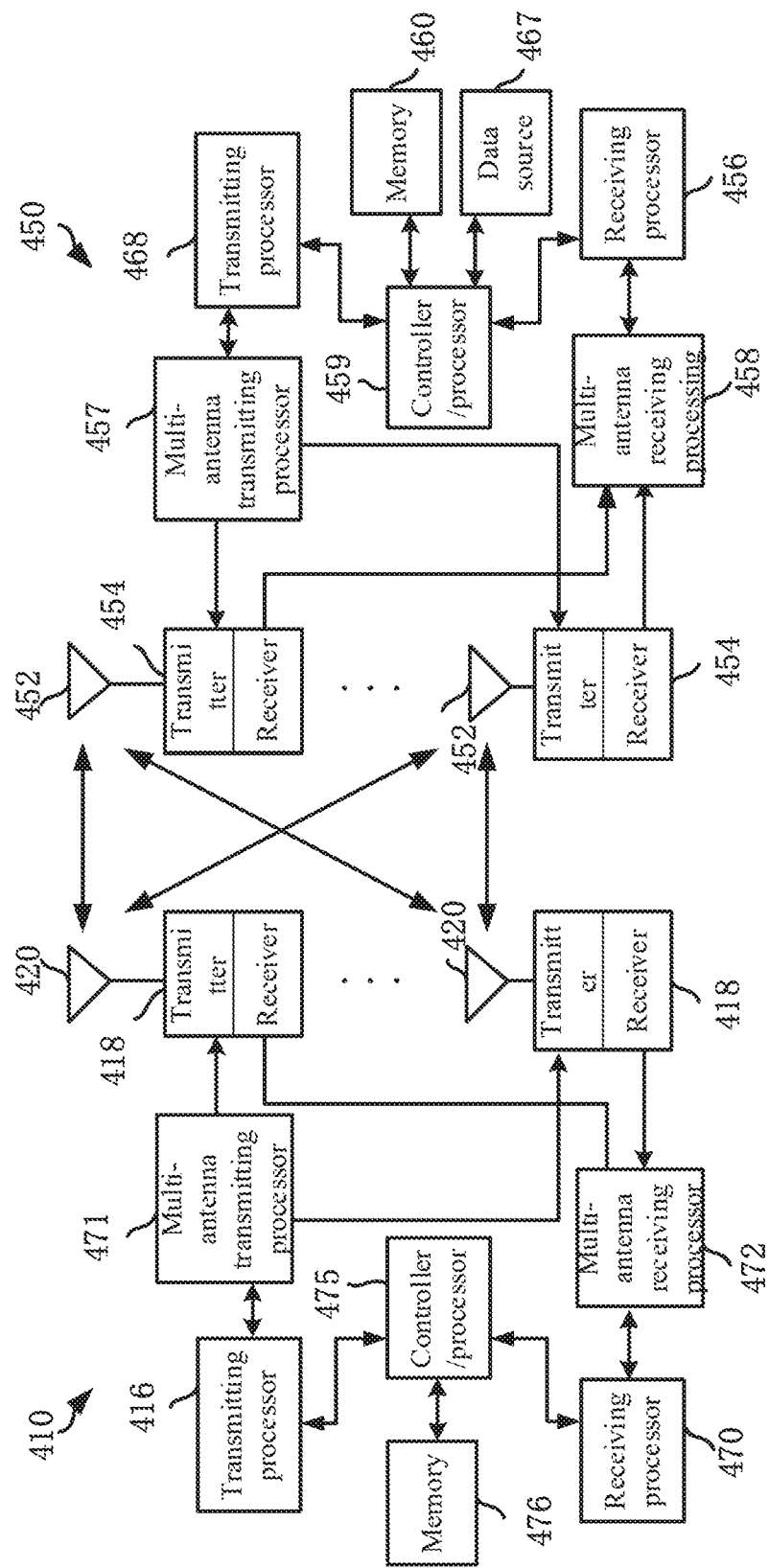
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 implements the functionality of the L2 layer. In the transmission from the first communication device 410 to the second communication device 450, the controller/processor 475 provides header compression, encryption, packet segmentation and reordering, multiplexing between a logical channel and a transport channel and radio resource allocation of the second communication device 450 based on various priorities. The controller/processor 475 is also in charge of a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the mapping of signal clusters corresponding to each modulation scheme (i.e., BPSK, QPSK, M-PSK, and M-QAM, etc.). The multi-antenna transmitting processor 471 performs digital spatial precoding, including codebook-based precoding and non-codebook-based precoding, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to antennas 420.

In a transmission from the first communication device 410 to the second communication device 450, at the second communication device 450, each receiver 454 receives a signal via a corresponding antenna 452. Each receiver 454 recovers information modulated onto the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the first communication device 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the first communication device 410. The transmitting processor 468 performs modulation and mapping, as well as channel coding, and the multi-antenna transmitting processor 457 performs digital multi-antenna spatial precoding, including codebook-based precoding and non-codebook-based precoding, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the second communication device 450 to the first communication device 410, the controller/processor 475 provides demultiplexing between a transport channel and a logical channel, packet reassembling, decrypting, header decompression, control signal processing so as to recover a higher-layer packet from the second communication device (UE) 450. The higher-layer packet coming from the controller/processor 475 may be provided to the core network.

In one embodiment, the first node of the present disclosure comprises the second communication device 450, and the second node of the present disclosure comprises the first communication device 410.

In one subembodiment, the first node is a UE, and the second node is a UE.

In one subembodiment, the first node is a UE, and the second node is a relay node.

In one subembodiment, the first node is a relay node, and the second node is a UE.

In one subembodiment, the second communication device 450 comprises at least one controller/processor; the at least one controller/processor is in charge of HARQ operation.

In one subembodiment, the first communication device 410 comprises at least one controller/processor; the at least one controller/processor is in charge of HARQ operation.

In one subembodiment, the first communication device 410 comprises at least one controller/processor; the at least one controller/processor is in charge of employing ACK and/or NACK protocol for error detection as a way to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least receives a first signal so as to determine a first channel quality; determines a first speed; determines whether a first resource pool comprises a first time-frequency resource block; selected a target time-frequency resource block from a first resource pool; and transmits a second signal in the target time-frequency resource block; the first speed is a speed of mobility of the first node; the first resource pool comprises multiple time-frequency resource blocks, and whether the first resource pool comprises the first time-frequency resource block is dependent on the first speed.

In one embodiment, the second communication device 450 comprises a memory that stores a computer readable instruction program. The computer readable instruction program generates an action when executed by at least one processor. The action includes receiving a first signal so as to determine a first channel quality; determining a first speed; determining whether a first resource pool comprises a first time-frequency resource block; selecting a target time-frequency resource block from a first resource pool; and transmitting a second signal in the target time-frequency resource block; the first speed is a speed of mobility of the first node; the first resource pool comprises multiple time-frequency resource blocks, and whether the first resource pool comprises the first time-frequency resource block is dependent on the first speed.

In one embodiment, the first communication device 410 comprises at least one processor and at least one memory. The at least one memory comprises computer program codes. The at least one memory and the computer program codes are configured to be used in collaboration with the at least one processor. The first communication device 410 at least transmits a first signal; the first signal is used for determining a first channel quality; a first speed is a speed of mobility of the first node; a first resource pool comprises multiple time-frequency resource blocks, and whether the first resource pool comprises a first time-frequency resource block is dependent on the first speed; a target time-frequency resource block is selected from the first resource pool; the target time-frequency resource block is used for transmitting a second signal.

In one embodiment, the first communication device 410 comprises a memory that stores a computer readable instruction program. The computer readable instruction program generates an action when executed by at least one processor. The action includes transmitting a first signal; the first signal is used for determining a first channel quality; a first speed is a speed of mobility of the first node; a first resource pool comprises multiple time-frequency resource blocks, and whether the first resource pool comprises a first time-frequency resource block is dependent on the first speed; a target time-frequency resource block is selected from the first resource pool; the target time-frequency resource block is used for transmitting a second signal.

In one embodiment, at least one of the antenna 452, the receiver 454, the multi-antenna receiving processor 458, the receiving processor 456, the controller/processor 459, the memory 460 or the data source 467 is used for receiving a first signal so as to determine a first channel quality in the present disclosure.

In one embodiment, at least one of the antenna 452, the receiver 454, the multi-antenna receiving processor 458, the receiving processor 456, the controller/processor 459, the memory 460 or the data source 467 is used for determining a first speed in the present disclosure.

In one embodiment, at least one of the antenna 452, the receiver 454, the multi-antenna receiving processor 458, the receiving processor 456, the controller/processor 459, the memory 460 or the data source 467 is used for determining whether a first resource pool comprises a first time-frequency resource block in the present disclosure.

In one embodiment, at least one of the antenna 452, the receiver 454, the multi-antenna receiving processor 458, the receiving processor 456, the controller/processor 459, the memory 460 or the data source 467 is used for measuring Q second-type channel parameters for Q time-frequency resource blocks respectively in the present disclosure.

In one embodiment, at least one of the antenna 452, the receiver 454, the multi-antenna receiving processor 458, the receiving processor 456, the controller/processor 459, the memory 460 or the data source 467 is used for receiving a second-type signal in the present disclosure.

In one embodiment, at least one of the antenna 452, the receiver 454, the multi-antenna receiving processor 458, the receiving processor 456, the controller/processor 459, the memory 460 or the data source 467 is used for receiving two first-type signals in the present disclosure.

In one embodiment, at least one of the antenna 452, the transmitter 454, the multi-antenna transmitting processor 458, the transmitting processor 468, the controller/processor 459, the memory 460 or the data source 467 is used for selecting a target time-frequency resource block from a first resource pool in the present disclosure.

In one embodiment, at least one of the antenna 452, the transmitter 454, the multi-antenna transmitting processor 458, the transmitting processor 468, the controller/processor 459, the memory 460 or the data source 467 is used for transmitting a second signal on the target time-frequency resource block in the present disclosure.

In one embodiment, at least one of the antenna 420, the transmitter 418, the multi-antenna transmitting processor 471, the transmitting processor 416, the controller/processor 475 or the memory 476 is used for transmitting a first signal in the present disclosure.

In one embodiment, at least one of the antenna 420, the transmitter 418, the multi-antenna transmitting processor 471, the transmitting processor 416, the controller/processor 475 or the memory 476 is used for transmitting two first-type signals in the present disclosure.

In one embodiment, at least one of the antenna 420, the receiver 418, the multi-antenna receiving processor 472, the receiving processor 470, the controller/processor 475 or the memory 476 is used for receiving the second signal on the target time-frequency resource block in the present disclosure.

Embodiment 5

Figure 5:
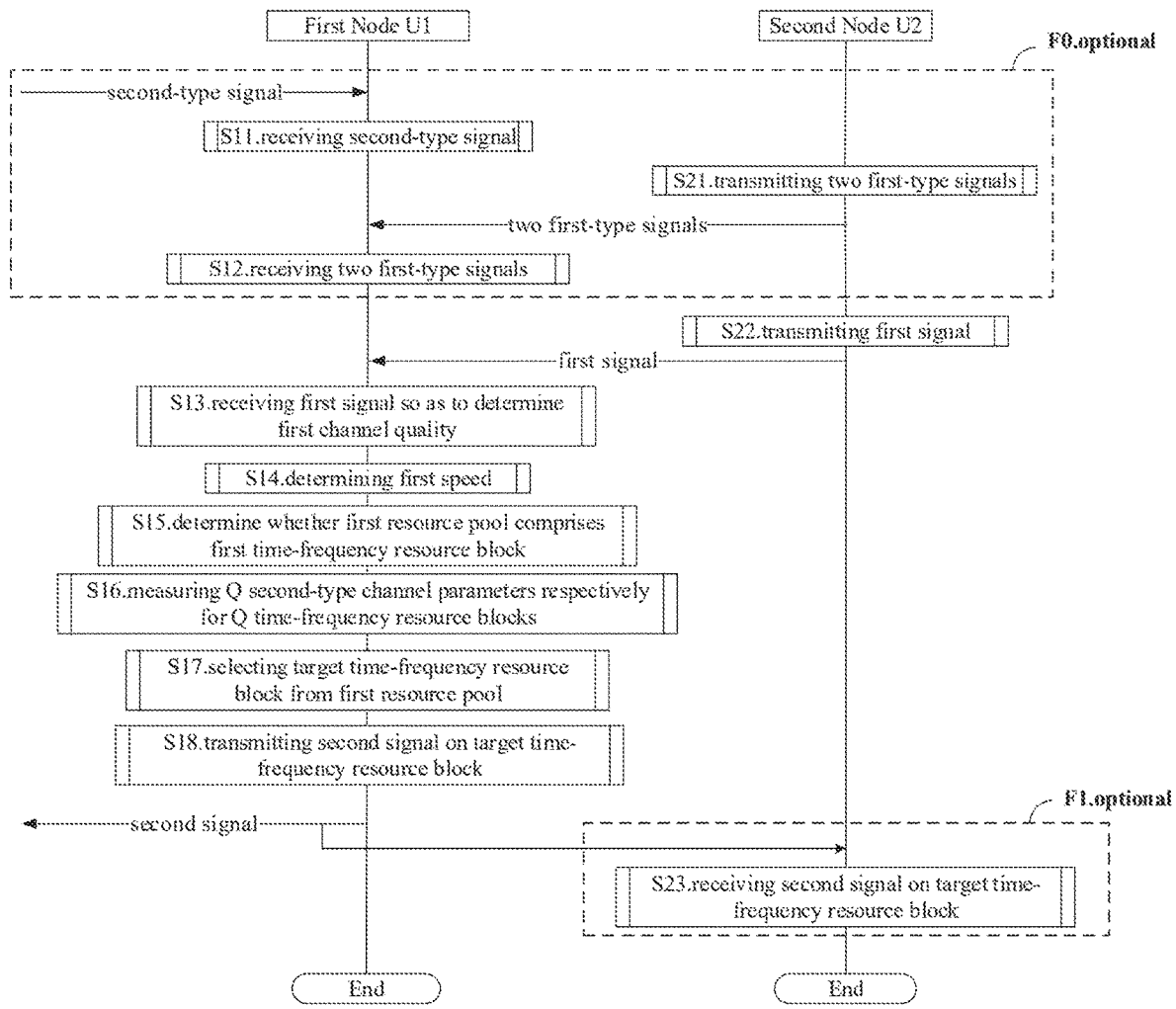
FIG. 5 illustrates a flowchart of radio signal transmission according to one embodiment of the present disclosure.

Embodiment 5 illustrates a flowchart of radio signal transmission according to one embodiment of the present disclosure, as shown in FIG. 5. In FIG. 5, a first node U1 and a second node U2 are in communication via an air interface. In FIG. 5, steps in dotted-lined box F0 are optional.

The first node U1 receives a second-type signal in step S11; receives two first-type signals in step S12; receives a first signal so as to determine a first channel quality in step S13; determines a first speed in step S14; determines whether a first resource pool comprises a first time-frequency resource block in step S15; measures Q second-type channel parameters for Q time-frequency resource blocks respectively in step S16; selects a target time-frequency resource block from a first resource pool in step S17; and transmits a second signal on a target time-frequency resource block in step S18.

The second node U2 transmits two first-type signals in step S21; transmits a first signal in step S22; and receives a second signal on a target time-frequency resource block in step S23.

In Embodiment 15, the first speed is a speed of mobility of the first node U1; the first resource pool comprises multiple time-frequency resource blocks, and whether the first resource pool comprises the first time-frequency resource block is dependent on the first speed; time-domain resources occupied by the two first-type signals are orthogonal; the first speed is related to a difference between two distances, the speed of mobility of the first node U1 is a speed of mobility between the first node U1 and the second node U2; the two first-type signals respectively indicate two positions; the two distances are respectively distances from the two positions to two reference positions; the second-type signal is used for determining the two reference positions; a transmitter of the second-type signal and the second node U2 are non-co-located; Q second-type channel parameters are respectively measured for Q time-frequency resource blocks, Q being a positive integer greater than 1; the first time-frequency resource block is one of the Q time-frequency resource blocks, and a second-type channel parameter measured for the first time-frequency resource block is a smallest value among the Q second-type channel parameters.

In one embodiment, the second node U2 is a transmitter of the first signal.

In one embodiment, steps marked by box F0 in FIG. 5 exist.

In one embodiment, steps marked by box F0 in FIG. 5 don't exist.

In one embodiment, when a speed of mobility of the first node U1 is an absolute speed of mobility of the first node U1, steps marked by box F0 in FIG. 5 don't exist.

In one embodiment, when a speed of mobility of the first node U1 is a traveling speed of the first node U1, steps marked by box F0 in FIG. 5 don't exist.

In one embodiment, when a speed of mobility of the first node U1 is a speed of mobility between the first node U1 and the third communication node, and the third communication node does not comprise a transmitter of the first signal, steps marked by box F0 in FIG. 5 don't exist.

In one embodiment, when a speed of mobility of the first node U1 is a speed of mobility between the first node U1 and the second node U2, steps marked by box F0 in FIG. 5 exist.

In one embodiment, when a speed of mobility of the first node U1 is a speed of mobility between the first node U1 and the fourth communication node, and the fourth communication node comprises the second node U2, steps marked by box F0 in FIG. 5 exist.

In one embodiment, when the first channel quality is lower than a first threshold, it is determined that the first resource pool comprises the first time-frequency resource block; when the first channel quality is higher than a first threshold, it is determined that the first resource pool does not comprise the first time-frequency resource block; the first threshold is related to the first speed.

In one embodiment, when the first channel quality is lower than a first threshold and the first speed is lower than a second threshold, it is determined that the first resource pool comprises the first time-frequency resource pool; when the first channel quality is higher than a first threshold, it is determined that the first channel quality is not lower than a first threshold or the first speed is not lower than a second threshold, it is determined that the first resource pool does not comprise the first time-frequency resource block.

In one embodiment, the first node U1 and the second node U2 are in communication via SL.

In one embodiment, a transmitter of the second-type signal does not comprise the second node U2.

In one embodiment, steps marked by box F1 in FIG. 5 exist.

In one embodiment, steps marked by box F1 in FIG. 5 don't exist.

In one embodiment, when a target receiver of the second signal does not comprise the second node U2, steps marked by box F1 in FIG. 5 don't exist.

In one embodiment, when a target receiver of the second signal comprises the second node U2, steps marked by box F1 in FIG. 5 exist.

In one embodiment, the second signal is transmitted through a PSCCH.

In one embodiment, the second signal is transmitted through a PSSCH.

In one embodiment, the second signal is transmitted through a PSCCH and a PSSCH.

In one embodiment, the second signal is transmitted through a Physical Uplink Shared Channel (PUSCH).

In one embodiment, the second signal is transmitted through a Narrowband Physical Uplink Shared Channel (NPUSCH).

In one embodiment, the second signal is transmitted via broadcast.

In one embodiment, the second signal is transmitted via groupcast.

In one embodiment, the second signal is transmitted via unicast.

In one embodiment, the second signal is cell-specific.

In one embodiment, the second signal is UE-specific.

In one embodiment, the second signal comprises an RS.

In one embodiment, the second signal comprises a DMRS.

In one embodiment, the second signal comprises a CSI-RS.

In one embodiment, the second signal comprises a PSSCH DMRS.

In one embodiment, the second signal comprises a PSCCH DMRS.

In one embodiment, the second signal comprises an SL DMRS.

In one embodiment, the second signal comprises an SL CSI-RS.

In one embodiment, the second signal comprises a second bit block; the second bit block comprises a positive integer number of sequentially arranged bits.

In one embodiment, the second bit block comprises a positive integer number of CB(s).

In one embodiment, the second bit block comprises a positive integer number of CBG(s).

In one embodiment, the second bit block comprises a TB.

In one embodiment, the second bit block is obtained by a TB gone through a TB-level CRC Attachment.

In one embodiment, the second bit block is one of CBs obtained by a TB sequentially gone through a TB-level CRC Attachment, Code Block Segmentation, and CB-level CRC Attachment.

In one embodiment, the second signal is obtained from all or part of bits comprised in the second bit block sequentially through TB-level CRC Attachment, Code Block Segmentation, and CB-level CRC Attachment, channel coding, rate matching, code block concatenation, scrambling, modulation, layer mapping, antenna port mapping, mapping to physical resource block, baseband signal generation and modulation and upconversion.

In one embodiment, the second signal is an output from the second bit block sequentially gone through a modulation mapper, a layer mapper, precoding, a resource element mapper, and multicarrier symbol generation.

In one embodiment, only the second bit block is used for generating the second signal.

In one embodiment, a bit block other than the second bit block is also used for generating the second signal.

In one embodiment, the second bit block comprises data transmitted on an SL-SCH.

In one embodiment, the second bit block comprises data transmitted on an SL-BCH.

In one embodiment, the second signal comprises one or more fields in a PHY layer signaling.

In one embodiment, the second signal comprises one or more fields in a piece of SCI.

In one embodiment, the second signal comprises one or more fields in a piece of Uplink Control Information (UCI).

In one embodiment, the second signal comprises all or part of a higher layer signaling.

Embodiment 6

Figure 6:
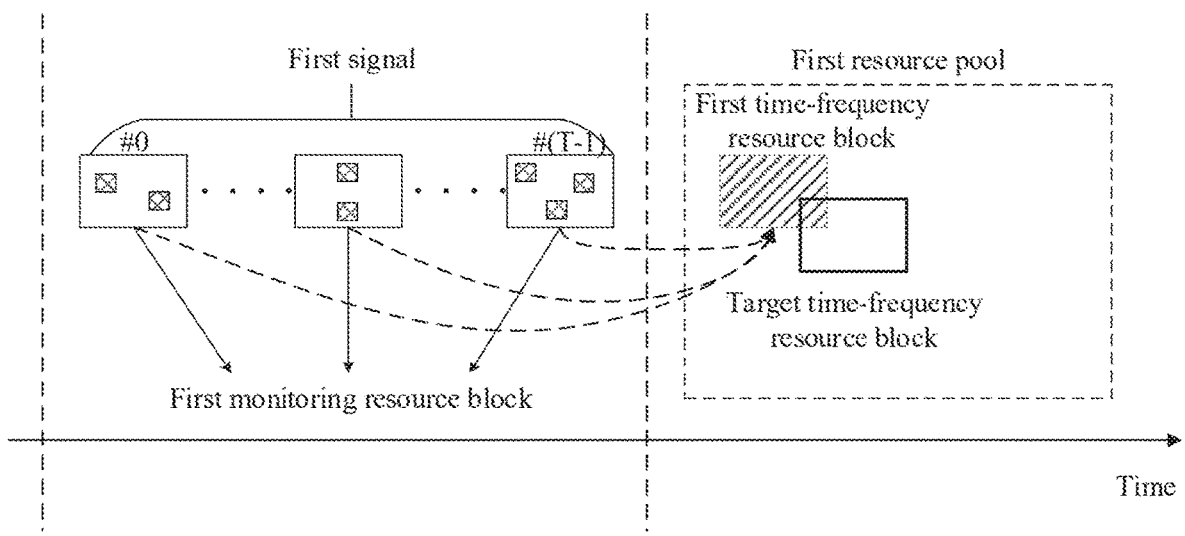
FIG. 6 illustrates a schematic diagram of relations among a first signal, a first time-frequency resource block, a target time-frequency resource block and a first resource pool according to one embodiment of the present disclosure.

Embodiment 6 illustrates a schematic diagram of relations among a first signal, a first time-frequency resource block, a target time-frequency resource block and a first resource pool according to one embodiment of the present disclosure, as shown in FIG. 6. In FIG. 6, the square framed with dotted lines represents a first resource pool, the slash-filled box represents a first time-frequency resource block, cross-filled boxes represent a first signal, and the blank box framed with thick lines represents a target time-frequency resource block.

In Embodiment 6, the first node receives a first signal so as to determine a first channel quality; the first signal is associated with the first time-frequency resource block; the first channel quality and the first speed are used for determining whether the first time-frequency resource block belongs to a first resource pool; and the first node selects the target time-frequency resource block from the first resource pool.

In one embodiment, the first resource pool comprises multiple time-frequency resource blocks.

In one embodiment, any time-frequency resource block of the multiple time-frequency resource blocks comprised in the first resource pool comprises a positive integer number of time-frequency resource unit(s).

In one embodiment, among the multiple time-frequency resource blocks each time-frequency resource block comprises a time-frequency resource unit.

In one embodiment, among the multiple time-frequency resource blocks each time-frequency resource block comprises a positive integer number of sub-channel(s).

In one embodiment, among the multiple time-frequency resource blocks each time-frequency resource block comprises a positive integer number of slot(s).

In one embodiment, among the multiple time-frequency resource blocks each time-frequency resource block comprises a positive integer number of subframe(s).

In one embodiment, among the multiple time-frequency resource blocks each time-frequency resource block comprises multiple Resource Elements (REs).

In one embodiment, among the multiple time-frequency resource blocks each time-frequency resource block comprises an equal number of REs.

In one embodiment, at least two time-frequency resource blocks among the multiple time-frequency resource blocks comprise different numbers of REs.

In one embodiment, among the multiple time-frequency resource blocks each time-frequency resource block occupies an equal time length.

In one embodiment, time-domain resources occupied by any two time-frequency resource blocks among the multiple time-frequency resource blocks are orthogonal (i.e., non-overlapped).

In one embodiment, the first resource pool is determined by the first node autonomously.

In one embodiment, the first resource pool is pre-configured.

In one embodiment, the first resource pool is used for PSSCH transmission.

In one embodiment, the first resource pool is used for PSCCH and PSSCH transmissions.

In one embodiment, any time-frequency resource block of the multiple time-frequency resource blocks comprised by the first resource pool comprises a Sidelink (SL).

In one embodiment, one of the multiple time-frequency resource blocks comprised by the first resource pool comprises a PSSCH.

In one embodiment, one of the multiple time-frequency resource blocks comprised by the first resource pool comprises a PSCCH.

In one embodiment, one of the multiple time-frequency resource blocks comprised by the first resource pool comprises a PSCCH and a PSSCH.

In one embodiment, at least one time-frequency resource block of the multiple time-frequency resource blocks comprised by the first resource pool comprises a Physical Sidelink Feedback Channel (PSFCH).

In one embodiment, any time-frequency resource block of the multiple time-frequency resource blocks comprised by the first resource pool does not comprise a Downlink (DL).

In one embodiment, any time-frequency resource block of the multiple time-frequency resource blocks comprised by the first resource pool does not comprise a Physical Downlink Shared Channel (PDSCH).

In one embodiment, any time-frequency resource block of the multiple time-frequency resource blocks comprised by the first resource pool does not comprise a Physical Downlink Control Channel (PDCCH).

In one embodiment, any time-frequency resource block of the multiple time-frequency resource blocks comprised by the first resource pool does not comprise an Uplink (UL).

In one embodiment, any time-frequency resource block of the multiple time-frequency resource blocks comprised by the first resource pool does not comprise a PUSCH.

In one embodiment, any time-frequency resource block of the multiple time-frequency resource blocks comprised by the first resource pool does not comprise a Physical Uplink Control Channel (PUCCH).

In one embodiment, any time-frequency resource block of the multiple time-frequency resource blocks comprised by the first resource pool is not used for transmitting a Sidelink Synchronization Signal (SLSS).

In one embodiment, any time-frequency resource block of the multiple time-frequency resource blocks comprised by the first resource pool does not comprise a Physical Sidelink Broadcast Channel (PSBCH).

In one embodiment, the first resource pool belongs to Unlicensed Spectrum.

In one embodiment, the first resource pool belongs to Licensed Spectrum.

In one embodiment, the first resource pool belongs to V2X-specific spectrum.

In one embodiment, the first resource pool belongs to a carrier.

In one embodiment, the first resource pool belongs to a Bandwidth Part (BWP).

In one embodiment, the first time-frequency resource block comprises a positive integer number of time-domain resource unit(s) in time domain.

In one embodiment, the positive integer number of time-domain resource units comprised by the first time-frequency resource block are consecutive in time.

In one embodiment, at least two time-domain resource units among the positive integer number of time-domain resource units comprised by the first time-frequency resource block are non-consecutive in time.

In one embodiment, the first time-frequency resource block comprises a positive integer number of frequency-domain resource unit(s) in frequency domain.

In one embodiment, the positive integer number of frequency-domain resource units comprised by the first time-frequency resource block are consecutive in frequency domain.

In one embodiment, at least two frequency-domain resource units among the positive integer number of frequency-domain resource units comprised by the first time-frequency resource block are non-consecutive in frequency domain.

In one embodiment, the first time-frequency resource block comprises a positive integer number of time-frequency resource unit(s).

In one embodiment, the positive integer number of time-frequency resource units comprised by the first time-frequency resource block are consecutive in time domain.

In one embodiment, the positive integer number of time-frequency resource units comprised by the first time-frequency resource block are consecutive in frequency domain.

In one embodiment, at least two time-frequency resource units among the positive integer number of time-frequency resource units comprised by the first time-frequency resource block are non-consecutive in time domain.

In one embodiment, at least two time-frequency resource units among the positive integer number of time-frequency resource units comprised by the first time-frequency resource block are non-consecutive in frequency domain.

In one embodiment, the first time-frequency resource block belongs to SL spectrum.

In one embodiment, the first time-frequency resource block belongs to UL spectrum.

In one embodiment, the first time-frequency resource block belongs to DL spectrum.

In one embodiment, the first time-frequency resource block comprises a PSCCH.

In one embodiment, the first time-frequency resource block comprises a PSSCH.

In one embodiment, the first time-frequency resource block comprises a PSFCH.

In one embodiment, the first time-frequency resource block comprises a PSCCH and a PSSCH.

In one embodiment, the first time-frequency resource block comprises a PSCCH and a PSFCH.

In one embodiment, the first time-frequency resource block comprises a PSCCH, a PSSCH and a PSFCH.

In one embodiment, the first time-frequency resource block comprises a PUCCH.

In one embodiment, the first time-frequency resource block comprises a PUSCH.

In one embodiment, the first time-frequency resource block comprises a PUCCH and a PUSCH.

In one embodiment, the first time-frequency resource block comprises a Physical Random Access Channel (PRACH) and a PUSCH.

In one embodiment, the first time-frequency resource block comprises a Narrowband Physical Uplink Control Channel (NPUCCH).

In one embodiment, the first time-frequency resource block comprises a NPUSCH.

In one embodiment, the first time-frequency resource block comprises a NPUCCH and a NPUSCH.

In one embodiment, the first channel quality is used for determining whether the first resource pool comprises the first time-frequency resource block.

In one embodiment, the first channel quality and the first speed are used for determining whether the first resource pool comprises the first time-frequency resource block.

In one embodiment, whether the first resource pool comprises the first time-frequency resource block is determined according to the first channel quality and the first speed.

In one embodiment, the first resource pool comprises the first time-frequency resource block.

In one embodiment, the first resource pool does not comprise the first time-frequency resource block.

In one embodiment, the first channel quality and the first speed are used for determining whether the first time-frequency resource block belongs to the first resource pool.

In one embodiment, the first time-frequency resource block belongs to the first resource pool.

In one embodiment, the first time-frequency resource block does not belong to the first resource pool.

In one embodiment, the first time-frequency resource block is one of the multiple time-frequency resource blocks comprised by the first resource pool.

In one embodiment, the first time-frequency resource block is not any of the multiple time-frequency resource blocks comprised by the first resource pool.

In one embodiment, when it is determined that the first time-frequency resource block can be occupied, the first resource pool comprises the first time-frequency resource block.

In one embodiment, when it is determined that the first time-frequency resource block can be occupied, the first resource pool does not comprise the first time-frequency resource block.

In one embodiment, when it is determined that the first time-frequency resource block cannot be occupied, the first resource pool does not comprise the first time-frequency resource block.

In one embodiment, when it is determined that the first time-frequency resource block cannot be occupied, the first time-frequency resource block does not belong to the first resource pool.

In one embodiment, when it is determined that the first time-frequency resource block can be occupied, the first time-frequency resource block is retained in the first resource pool.

In one embodiment, when it is determined that the first time-frequency resource block cannot be occupied, the first time-frequency resource block is removed from the first resource pool.

In one embodiment, when it is determined that the first resource pool comprises the first time-frequency resource block, the first time-frequency resource block is one of the multiple time-frequency resource blocks comprised by the first resource pool.

In one embodiment, when it is determined that the first resource pool does not comprise the first time-frequency resource block, the first time-frequency resource block is not any of the multiple time-frequency resource blocks comprised by the first resource pool.

In one embodiment, when it is determined that the first resource pool comprises the first time-frequency resource block, the first time-frequency resource block is retained in the first resource pool.

In one embodiment, when it is determined that the first resource pool does not comprise the first time-frequency resource block, the first time-frequency resource block is removed from the first resource pool.

In one embodiment, the target time-frequency resource block comprises a positive integer number of time-domain resource unit(s) in time domain.

In one embodiment, the positive integer number of time-domain resource units comprised by the target time-frequency resource block are consecutive in time.

In one embodiment, at least two time-domain resource units among the positive integer number of time-domain resource units comprised by the target time-frequency resource block are non-consecutive in time.

In one embodiment, the target time-frequency resource block comprises a positive integer number of frequency-domain resource unit(s) in frequency domain.

In one embodiment, the positive integer number of frequency-domain resource units comprised by the target time-frequency resource block are consecutive in frequency domain.

In one embodiment, at least two frequency-domain resource units among the positive integer number of frequency-domain resource units comprised by the target time-frequency resource block are non-consecutive in frequency domain.

In one embodiment, the target time-frequency resource block comprises a positive integer number of time-frequency resource unit(s).

In one embodiment, the positive integer number of time-frequency resource units comprised by the target time-frequency resource block are consecutive in time domain.

In one embodiment, the positive integer number of time-frequency resource units comprised by the target time-frequency resource block are consecutive in frequency domain.

In one embodiment, at least two time-frequency resource units among the positive integer number of time-frequency resource units comprised by the target time-frequency resource block are nonconsecutive in time domain.

In one embodiment, at least two time-frequency resource units among the positive integer number of time-frequency resource units comprised by the target time-frequency resource block are nonconsecutive in frequency domain.

In one embodiment, the target time-frequency resource block comprises a PSCCH.

In one embodiment, the target time-frequency resource block comprises a PSSCH.

In one embodiment, the target time-frequency resource block comprises a PSFCH.

In one embodiment, the target time-frequency resource block comprises a PSCCH and a PSSCH.

In one embodiment, the target time-frequency resource block comprises a PSCCH and a PSFCH.

In one embodiment, the target time-frequency resource block comprises a PSCCH, a PSSCH and PSFCH.

In one embodiment, the first resource pool comprises the target time-frequency resource block.

In one embodiment, the target time-frequency resource block belongs to the first resource pool.

In one embodiment, the target time-frequency resource block is one of the multiple time-frequency resource blocks comprised by the first resource pool.

In one embodiment, the phrase of selecting a target time-frequency resource block from a first resource pool comprises reporting the first resource pool to a higher layer of a first node.

In one embodiment, the phrase of selecting a target time-frequency resource block from a first resource pool comprises that a higher layer of a first node selects the target time-frequency resource block at random from the first resource pool.

In one embodiment, the phrase of selecting a target time-frequency resource block from a first resource pool comprises that each time-frequency resource block in the first resource pool is equally likely to be selected as the target time-frequency resource block as the target time-frequency resource block.

In one embodiment, the phrase of selecting a target time-frequency resource block from a first resource pool comprises that a higher layer of a first node selects a time-frequency resource block with the best channel quality from the first resource pool as the target time-frequency resource block.

In one embodiment, the phrase of selecting a target time-frequency resource block from a first resource pool comprises selecting a time-frequency resource block corresponding to a smallest value amongst second-type channel parameters from the multiple time-frequency resource blocks comprised by the first resource pool as the target time-frequency resource block.

In one embodiment, a second-type channel parameter measured for the target time-frequency resource block is a smallest value among multiple second-type channel parameters measured respectively for the multiple time-frequency resource blocks comprised by the first resource pool.

In one embodiment, it is indicated that the first node selects the target time-frequency resource block.

In one embodiment, the first node selects the target time-frequency resource block according to the first signal.

In one embodiment, the first signal is used to select the target time-frequency resource block from the first resource pool.

In one embodiment, a number of bits comprised in the first bit block is used to select the target time-frequency resource block from the first resource pool.

In one embodiment, whether the first signal is a retransmission of the first bit block is used to select the target time-frequency resource block from the first resource pool.

In one embodiment, the target time-frequency resource block is overlapped with the first time-frequency resource block.

In one embodiment, the target time-frequency resource block is orthogonal with the first time-frequency resource block.

In one embodiment, the target time-frequency resource block comprises the first time-frequency resource block.

In one embodiment, the target time-frequency resource block belongs to the first time-frequency resource block.

In one embodiment, the target time-frequency resource does not comprise the first time-frequency resource block.

In one embodiment, the first node autonomously selects the target time-frequency resource block from the first resource pool.

In one embodiment, the first node autonomously determines the target time-frequency resource block out of the first resource pool.

In one embodiment, the first node is configured with the target time-frequency resource block.

In one embodiment, a target time-frequency resource block is selected from a first resource pool, and a second signal is transmitted on the target time-frequency resource block.

In one embodiment, the first node transmits the second signal on the target time-frequency resource block, and the target time-frequency resource block is one of the multiple time-frequency resource blocks comprised by the first resource pool.

In one embodiment, a time-frequency resource unit occupied by the first signal is associated with the first time-frequency resource block.

In one embodiment, a time-domain resource unit occupied by the first signal is associated with the first time-frequency resource block.

In one embodiment, a frequency-domain resource unit occupied by the first signal is associated with the first time-frequency resource block.

In one embodiment, a frequency-domain resource unit occupied by the first signal comprises a frequency-domain resource unit occupied by the first time-frequency resource block.

In one embodiment, a frequency-domain resource unit occupied by the first signal belongs to a frequency-domain resource unit occupied by the first time-frequency resource block.

In one embodiment, the first signal is transmitted on a first monitoring resource block, and a time-frequency resource unit occupied by the first signal belongs to a time-frequency resource unit occupied by the first monitoring resource block.

In one embodiment, apart from a time-frequency resource unit occupied by the first signal, the first monitoring resource block also comprises other time-frequency resource unit(s).

In one embodiment, apart from Resource Element(s) (RE) occupied by the first signal, the first monitoring resource block also comprises other RE(s).

In one embodiment, the time-frequency resource unit occupied by the first signal has a centralized distribution in the first monitoring resource block.

In one embodiment, the time-frequency resource unit occupied by the first signal has a discrete distribution in the first monitoring resource block.

In one embodiment, the time-frequency resource unit occupied by the first signal has a star-like distribution in the first monitoring resource block.

In one embodiment, a frequency-domain resource unit occupied by the first monitoring resource block is the same as a frequency-domain resource unit occupied by the first time-frequency resource block.

In one embodiment, a time-domain resource unit occupied by the first signal is earlier than a time-domain resource unit occupied by the first time-frequency resource block.

In one embodiment, a time-domain resource unit occupied by the first monitoring resource block is earlier than a time-domain resource unit occupied by the first time-frequency resource block.

In one embodiment, a first time-domain interval is a time interval between a time-domain resource unit occupied by the first time-frequency resource block and a time-domain resource unit occupied by the first signal.

In one embodiment, a first time-domain interval is a time interval between a time-domain resource unit occupied by the first time-frequency resource block and a time-domain resource unit occupied by the first monitoring resource block.

In one embodiment, the first time-domain interval comprises a positive integer number of time-domain resource unit(s).

In one embodiment, the first time-domain interval is pre-defined.

In one embodiment, the first time-domain interval is configurable.

In one embodiment, the first time-domain interval is indicated by a physical layer signaling.

In one embodiment, the first time-frequency resource block is used for determining a pattern of the first signal.

In one embodiment, the first time-frequency resource block is used for generating a scrambling sequence of the first signal.

In one embodiment, the first time-frequency resource block is used for determining an initial sequence of the first signal.

In one embodiment, the first signal comprises T first-type sub-signals, a first monitoring resource block comprises T first-type monitoring sub-resource blocks, and the T first-type sub-signals are respectively transmitted on the T first-type monitoring sub-resource blocks.

In one embodiment, each of the T first-type monitoring sub-resource blocks is associated with the first time-frequency resource block.

In one embodiment, a frequency-domain resource unit occupied by any of the T first-type monitoring sub-resource blocks belongs to a frequency-domain resource unit occupied by the first time-frequency resource block.

In one embodiment, a frequency-domain resource unit occupied by any of the T first-type monitoring sub-resource blocks is the same as a frequency-domain resource unit occupied by the first time-frequency resource block.

In one embodiment, each of the T first-type monitoring sub-resource blocks is earlier than the first time-frequency resource block.

In one embodiment, T first-type time-domain intervals are respectively time intervals between time-domain resource units respectively occupied by the T first-type monitoring sub-resource blocks and a time-domain resource unit occupied by the first time-frequency resource block.

In one embodiment, the first time-domain interval is one of the T first-type time-domain intervals.

In one embodiment, of the T first-type time-domain intervals any first-type time-domain interval is linear with a first basic time-domain interval.

In one embodiment, of the T first-type time-domain intervals any first-type time-domain interval is in proportion to a first basic time-domain interval.

In one embodiment, of the T first-type time-domain intervals any first-type time-domain interval is a multiple of a first basic time-domain interval.

In one embodiment, the first time-domain interval is equal to the first basic time-domain interval.

In one embodiment, the first time-domain interval is equal to a multiple of the first basic time-domain interval.

In one embodiment, the first basic time-domain interval comprises a positive integer number of time-domain resource unit(s).

Embodiment 7

Figure 7:
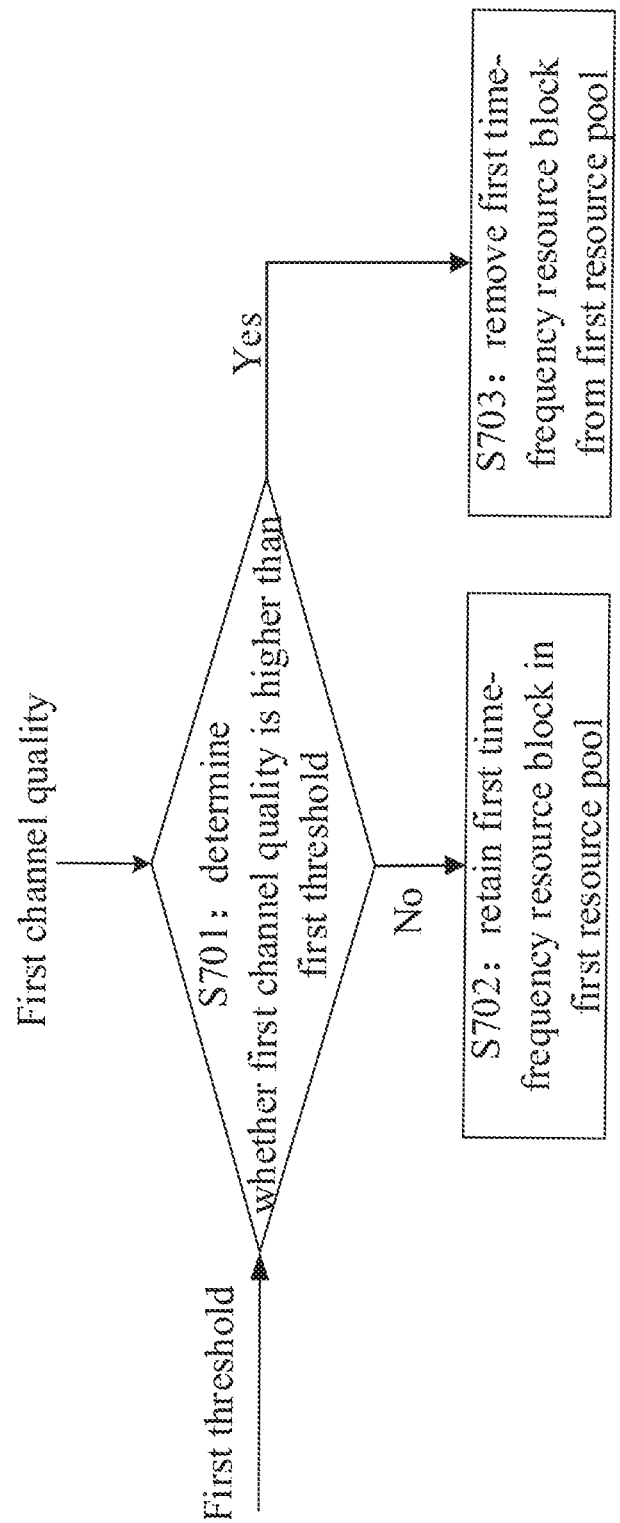
FIG. 7 illustrates a flowchart of determining whether a first resource pool comprises a first time-frequency resource block according to one embodiment of the present disclosure.

Embodiment 7 illustrates a flowchart of determining whether a first resource pool comprises a first time-frequency resource block according to one embodiment of the present disclosure, as shown in FIG. 7.

In Embodiment 7: determine whether a first channel quality is higher than a first threshold in step S701; when the result of determining whether the first channel quality is higher than the first threshold is no, take step S702 to retain a first time-frequency resource block in a first resource pool; when the result of determining whether the first channel quality is higher than the first threshold is yes, take step S703 to remove a first time-frequency resource block from a first resource pool. In Embodiment 7, the first threshold is related to the first speed.

In one embodiment, the first channel quality is not lower than the first threshold, and the result of determining whether the first channel quality is higher than the first threshold is yes.

In one embodiment, the first channel quality is higher than the first threshold, and the result of determining whether the first channel quality is higher than the first threshold is yes.

In one embodiment, the first channel quality is equal to the first threshold, and the result of determining whether the first channel quality is higher than the first threshold is yes.

In one embodiment, the first channel quality is not higher than the first threshold, and the result of determining whether the first channel quality is higher than the first threshold is no.

In one embodiment, the first channel quality is lower than the first threshold, and the result of determining whether the first channel quality is higher than the first threshold is no.

In one embodiment, the first channel quality is equal to the first threshold, and the result of determining whether the first channel quality is higher than the first threshold is no.

In one embodiment, the first time-frequency resource block is one of the multiple time-frequency resource blocks comprised by the first resource pool, when the first channel quality is higher than the first threshold, the first time-frequency resource block is removed from the first resource pool.

In one embodiment, the first time-frequency resource block is one of the multiple time-frequency resource blocks comprised by the first resource pool, when the first channel quality is equal to the first threshold, the first time-frequency resource block is removed from the first resource pool.

In one embodiment, the first time-frequency resource block is one of the multiple time-frequency resource blocks comprised by the first resource pool, when the first channel quality is no higher than the first threshold, the first time-frequency resource block is retained in the first resource pool.

In one embodiment, the first time-frequency resource block is one of the multiple time-frequency resource blocks comprised by the first resource pool, when the first channel quality is lower than the first threshold, the first time-frequency resource block is retained in the first resource pool.

In one embodiment, the first time-frequency resource block is one of the multiple time-frequency resource blocks comprised by the first resource pool, when the first channel quality is equal to the first threshold, the first time-frequency resource block is retained in the first resource pool.

In one embodiment, when the first channel quality is higher than the first threshold, it is determined that the first resource pool does not comprise the first time-frequency resource block.

In one embodiment, when the first channel quality is equal to the first threshold, it is determined that the first resource pool does not comprise the first time-frequency resource block.

In one embodiment, when the first channel quality is no higher than the first threshold, it is determined that the first resource pool comprises the first time-frequency resource block.

In one embodiment, when the first channel quality is lower than the first threshold, it is determined that the first resource pool comprises the first time-frequency resource block.

In one embodiment, when the first channel quality is equal to the first threshold, it is determined that the first resource pool comprises the first time-frequency resource block.

In one embodiment, the first resource pool comprises the first time-frequency resource block, and the first time-frequency resource block can be used for transmitting the second signal.

In one embodiment, the first resource pool does not comprise the first time-frequency resource block, and the first time-frequency resource block cannot be used for transmitting the second signal.

In one embodiment, the first resource pool comprises the first time-frequency resource block, the second signal is transmitted on the target time-frequency resource block, and the target time-frequency resource block is overlapped with the first time-frequency resource block.

In one embodiment, the first resource pool comprises the first time-frequency resource block, the second signal is transmitted on the target time-frequency resource block, and the target time-frequency resource block is orthogonal with the first time-frequency resource block.

In one embodiment, the first resource pool comprises the first time-frequency resource block, the second signal is transmitted on the target time-frequency resource block, and the target time-frequency resource block belongs to the first time-frequency resource block.

In one embodiment, the first resource pool does not comprise the first time-frequency resource block, transmitting the second signal on the first time-frequency resource block is dropped.

In one embodiment, the first resource pool does not comprise the first time-frequency resource block, the second signal is transmitted on the target time-frequency resource block, and the target time-frequency resource block is orthogonal with the first time-frequency resource block.

In one embodiment, the first channel quality and the first threshold are both measured by dBm.

In one embodiment, the first channel quality and the first threshold are both measured by dB.

In one embodiment, the first channel quality and the first threshold are both measured by W.

In one embodiment, the first channel quality and the first threshold are both measured by mW.

In one embodiment, the first threshold comprises an even number between −128 dBm and 10 dBm.

In one embodiment, the first threshold comprises minus infinity dBm.

In one embodiment, the first threshold comprises plus infinity dBm.

In one embodiment, a first threshold list comprises a positive integer number of first-type threshold(s), where the first threshold is one of the positive integer number of first-type threshold(s).

In one embodiment, a first threshold list comprises 64 first-type thresholds.

In one embodiment, a first threshold list comprises 67 first-type thresholds.

In one embodiment, the positive integer number of first-type thresholds comprised in the first threshold list are sequentially arranged in an ascending order.

In one embodiment, the first threshold list comprises minus infinity dBm, −128 dBm, −126 dBm . . . , and plus infinity dBm.

In one embodiment, the first threshold list excludes minus infinity dBm and plus infinity dBm.

In one embodiment, the first threshold list includes minus infinity dBm and plus infinity dBm.

In one embodiment, the first threshold list comprises non-positive integral values from −128 dBm through 0 dBm.

In one embodiment, the first threshold list comprises even numbers from −128 dBm through 0 dBm.

In one embodiment, the first threshold list is configured by a higher-layer signaling.

In one embodiment, a positive integer number of first-type threshold indexes respectively correspond to the positive integer number of first-type thresholds comprised in the first threshold list, and any of the positive integer number of first-type threshold indexes is a non-negative integer.

In one embodiment, a first threshold index is one of the positive integer number of first-type threshold indexes.

In one embodiment, the first threshold index is a positive integer.

In one embodiment, the first threshold index is a non-negative integer between 0 and 66.

In one embodiment, the first threshold index is an integer number between 1 and 64.

In one embodiment, the first threshold index is an integer number between 1 and 65.

In one embodiment, the first threshold index is one of the positive integer number of first-type threshold indexes that corresponds to the first threshold.

In one embodiment, the first threshold index is used for indicating the first threshold from the first threshold list.

In one embodiment, the first threshold index is linear with a first priority and a second priority.

In one embodiment, the first threshold is a sum of a product of a second priority and a first factor, a product of a first priority and a second factor, and a first constant.

In one embodiment, the first threshold index is equal to $a \times p2 + b \times p1 + c$, where a is the first factor, p2 is the second priority, b is the second factor, p1 is the first priority, and C is the first constant.

In one embodiment, the first factor is a positive integer.

In one embodiment, the first factor is equal to 8.

In one embodiment, the second factor is a positive integer.

In one embodiment, the second factor is equal to 1.

In one embodiment, the first constant is a positive integer.

In one embodiment, the first constant is equal to 1.

In one embodiment, the first threshold is equal to $(-128 + (q-1)*2)$ dBm, q is a first threshold index, the q is a positive integer greater than 0 and less than 66.

In one embodiment, the first threshold index is 0, and the first threshold is minus infinity dBm.

In one embodiment, the first threshold index is 66, and the first threshold is plus infinity dBm.

In one embodiment, the first priority is one of Py first-type priorities, Py being a positive integer.

In one embodiment, the second priority is one of Py first-type priorities.

In one embodiment, any first-type priority of the Py first-type priorities is a non-negative integer.

In one embodiment, any first-type priority of the Py first-type priorities is a positive integer.

In one embodiment, the Py is equal to 8.

In one embodiment, the first priority is a positive integer among Py positive integers.

In one embodiment, the first priority is a positive integer between 1 and the Py.

In one embodiment, the second priority is a positive integer among Py positive integers.

In one embodiment, the second priority is a positive integer between 1 and the Py.

In one embodiment, a message of PC5 interface is assigned one of the Py first-type priorities.

In one embodiment, a message of PC5 interface corresponds to one of the Py first-type priorities.

In one embodiment, a V2X message is assigned one of the Py first-type priorities.

In one embodiment, a V2X message corresponds to one of the Py first-type priorities.

In one embodiment, a UE serves a packet based on a first-type priority corresponding to the packet; the packet comprises a positive integer number of sequentially arranged bits.

In one embodiment, a first candidate bit block corresponds to a first priority, a second candidate bit block corresponds to a second priority; the first candidate bit block comprises a positive integer number of sequentially arranged bits; and the second candidate bit block comprises a positive integer number of sequentially arranged bits.

In one embodiment, the first speed is used for determining the first threshold.

In one embodiment, the first speed is used for determining the first threshold index.

In one embodiment, the first speed is used for determining the first threshold list.

In one embodiment, the first threshold gets lower as the first speed increases.

In one embodiment, when the first speed does not exceed a second threshold, the first threshold is a first candidate value; when the first speed exceeds a second threshold, the first threshold is a second candidate value.

In one embodiment, the first candidate value is different from the second candidate value.

In one embodiment, the first candidate value is higher than the second candidate value.

In one embodiment, the first candidate value is 3 dB higher than the second candidate value.

In one embodiment, the first candidate value is XdB higher than the second candidate value, X being a configurable value.

In one embodiment, the first candidate value is a constant.

In one embodiment, the second candidate value is a constant.

In one embodiment, the first candidate value is configurable, and the second candidate value is configurable.

In one embodiment, the first candidate value is configurable, and a difference between the first candidate value and the second candidate value is configurable.

Embodiment 8

Figure 8:
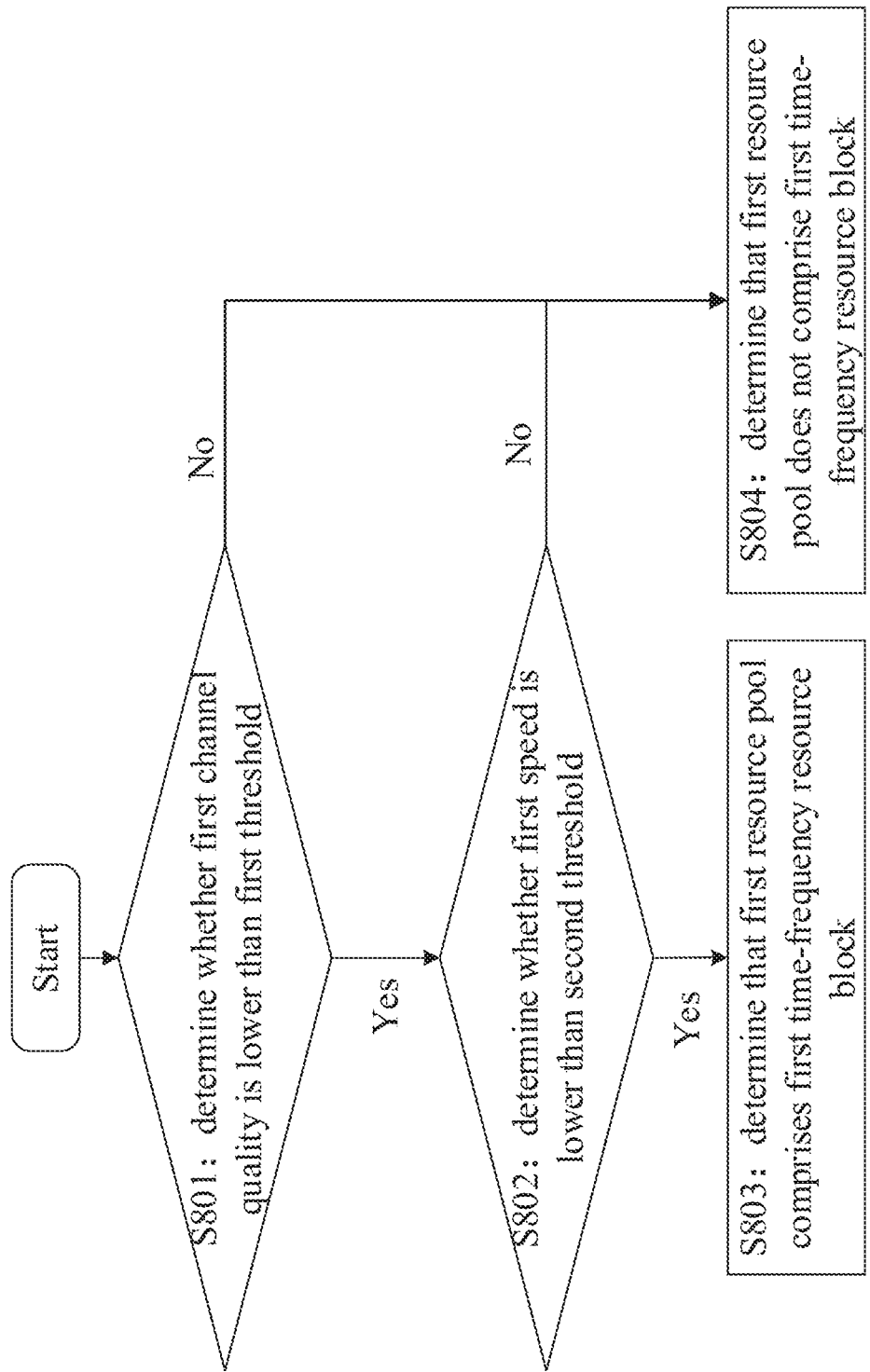
FIG. 8 illustrates a flowchart of determining whether a first resource pool comprises a first time-frequency resource block according to one embodiment of the present disclosure.

Embodiment 8 illustrates a flowchart of determining whether a first resource pool comprises a first time-frequency resource block according to one embodiment of the present disclosure, as shown in FIG. 8.

In Embodiment 8: determine whether a first channel quality is lower than a first threshold in step S801; when the result of determining whether a first channel quality is lower than a first threshold is yes, take step S802 to determine whether a first speed is lower than a second threshold; when the result of determining whether a first channel quality is lower than a second threshold is yes, take step S803 to determine whether a first resource pool comprises a first time-frequency resource block; when the result of determining whether a first channel quality is lower than a first threshold is no, take step S804 to determine that a first resource pool does not comprise a first time-frequency resource block; when the result of determining whether a first speed is lower than a second threshold is no, take step S804 to determine that a first resource pool does not comprise a first time-frequency resource block.

In one embodiment, the first channel quality is no higher than the first threshold, the result of determining whether a first channel quality is lower than a first threshold is yes.

In one embodiment, the first channel quality is lower than the first threshold, the result of determining whether a first channel quality is lower than a first threshold is yes.

In one embodiment, the first channel quality is equal to the first threshold, the result of determining whether a first channel quality is lower than a first threshold is yes.

In one embodiment, the first channel quality is not lower than the first threshold, the result of determining whether a first channel quality is lower than a first threshold is no.

In one embodiment, the first channel quality is higher than the first threshold, the result of determining whether a first channel quality is lower than a first threshold is no.

In one embodiment, the first channel quality is equal to the first threshold, the result of determining whether a first channel quality is lower than a first threshold is no.

In one embodiment, the first speed is no higher than the second threshold, the result of determining whether a first speed is lower than a second threshold is yes.

In one embodiment, the first speed is lower than the second threshold, the result of determining whether a first speed is lower than a second threshold is yes.

In one embodiment, the first speed is equal to the second threshold, the result of determining whether a first speed is lower than a second threshold is yes.

In one embodiment, the first speed is not lower than the second threshold, the result of determining whether a first speed is lower than a second threshold is no.

In one embodiment, the first speed is higher than the second threshold, the result of determining whether a first speed is lower than a second threshold is no.

In one embodiment, the first speed is equal to the second threshold, the result of determining whether a first speed is lower than a second threshold is no.

In one embodiment, the first time-frequency resource block is one of multiple time-frequency resource blocks comprised by the first resource pool, when the first speed is higher than the second threshold, the first time-frequency resource block is removed from the first resource pool.

In one embodiment, the first time-frequency resource block is one of multiple time-frequency resource blocks comprised by the first resource pool, when the first speed is equal to the second threshold, the first time-frequency resource block is removed from the first resource pool.

In one embodiment, the first time-frequency resource block is one of multiple time-frequency resource blocks comprised by the first resource pool, when the first channel quality is no higher than the first threshold, and the first speed is no higher than the second threshold, the first time-frequency resource block is retained in the first resource pool.

In one embodiment, the first time-frequency resource block is one of multiple time-frequency resource blocks comprised by the first resource pool, when the first channel quality is lower than the first threshold, and the first speed is lower than the second threshold, the first time-frequency resource block is retained in the first resource pool.

In one embodiment, the first time-frequency resource block is one of multiple time-frequency resource blocks comprised by the first resource pool, when the first channel quality is lower than the first threshold, and the first speed is equal to the second threshold, the first time-frequency resource block is retained in the first resource pool.

In one embodiment, the first time-frequency resource block is one of multiple time-frequency resource blocks comprised by the first resource pool, when the first channel quality is equal to the first threshold, and the first speed is lower than the second threshold, the first time-frequency resource block is retained in the first resource pool.

In one embodiment, the first time-frequency resource block is one of multiple time-frequency resource blocks comprised by the first resource pool, when the first channel quality is equal to the first threshold, and the first speed is equal to the second threshold, the first time-frequency resource block is retained in the first resource pool.

In one embodiment, when the first speed is higher than the second threshold, it is determined that the first resource pool does not comprise the first time-frequency resource block.

In one embodiment, when the first speed is equal to the second threshold, it is determined that the first resource pool does not comprise the first time-frequency resource block.

In one embodiment, when the first channel quality is no higher than the first threshold, and the first speed is no higher than the second threshold, it is determined that the first resource pool comprises the first time-frequency resource block.

In one embodiment, when the first channel quality is no higher than the first threshold, and the first speed is lower than the second threshold, it is determined that the first resource pool comprises the first time-frequency resource block.

In one embodiment, when the first channel quality is no higher than the first threshold, and the first speed is equal to the second threshold, it is determined that the first resource pool comprises the first time-frequency resource block.

In one embodiment, when the first channel quality is lower than the first threshold, and the first speed is no higher than the second threshold, it is determined that the first resource pool comprises the first time-frequency resource block.

In one embodiment, when the first channel quality is lower than the first threshold, and the first speed is lower than the second threshold, it is determined that the first resource pool comprises the first time-frequency resource block.

In one embodiment, when the first channel quality is lower than the first threshold, and the first speed is equal to the second threshold, it is determined that the first resource pool comprises the first time-frequency resource block.

In one embodiment, when the first channel quality is equal to the first threshold, and the first speed is no higher than the second threshold, it is determined that the first resource pool comprises the first time-frequency resource block.

In one embodiment, when the first channel quality is equal to the first threshold, and the first speed is lower than the second threshold, it is determined that the first resource pool comprises the first time-frequency resource block.

In one embodiment, when the first channel quality is equal to the first threshold, and the first speed is equal to the second threshold, it is determined that the first resource pool comprises the first time-frequency resource block.

In one embodiment, the second threshold is a distance of travelling per unit time.

In one embodiment, the second threshold is a number of zones switched per unit time.

In one embodiment, the second threshold is measured by km/h.

In one embodiment, the second threshold is measured by m/h.

In one embodiment, the second threshold is measured by m/s.

In one embodiment, the second threshold is measured by mile/h.

In one embodiment, the second threshold is measured by the number of zones per second.

In one embodiment, the second threshold is measured by the number of zones per hour.

In one embodiment, the second threshold is pre-defined.

In one embodiment, the second threshold is pre-configured.

In one embodiment, the second threshold is fixed.

In one embodiment, the second threshold is a constant.

In one embodiment, the second threshold is configurable.

Embodiment 9

Figure 9:
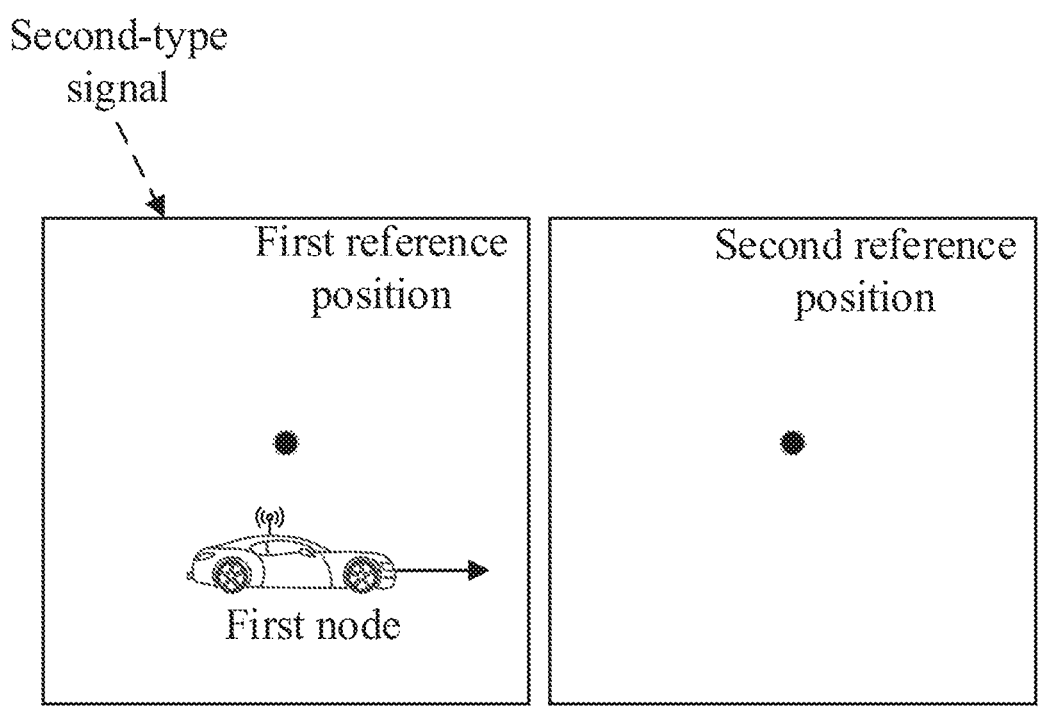
FIG. 9 illustrates a schematic diagram of relations between a second-type signal and two reference positions according to one embodiment of the present disclosure.

Embodiment 9 illustrates a schematic diagram of relations between a second-type signal and two reference positions according to one embodiment of the present disclosure, as shown in FIG. 9. In FIG. 9, the two large squares respectively represent a first reference position and a second reference position in the present disclosure, and the solid-lined arrow represents a speed and direction of mobility of the first node.

In Embodiment 9, the two reference positions of the present disclosure are a first reference position and a second reference position, respectively; the second-type signal is used for determining the first reference position; and a speed and direction of mobility of the first node are used for determining the second reference position.

In one embodiment, the first node determines one of the two reference positions, that is the first reference position, based on the second-type signal.

In one embodiment, the first node determines the second reference position based on the first reference position and a speed and direction of mobility of the first node.

In one embodiment, the second-type signal comprises a first sub-signal and a second sub-signal, of which the first sub-signal is used for determining the first reference position, and the second sub-signal is used for determining the second reference position.

In one embodiment, the first reference position is a Zone.

In one embodiment, the first reference position is an SL Zone.

In one embodiment, the first reference position is a cell.

In one embodiment, the first reference position is a coverage of a transmission point.

In one embodiment, the first reference position is a geographic zone.

In one embodiment, the first reference position is a geographic position of a transmission point.

In one embodiment, the first reference position is a geographic position of third communication node.

In one embodiment, the first reference position is a geographic position of the first node.

In one embodiment, the first reference position is a geographic position of the first node at a first instant of time.

In one embodiment, the first reference position is a zone where the first node is located.

In one embodiment, the first reference position is a zone where the first node is located at a first instant of time.

In one embodiment, the first reference position is an SL Zone where the first node is located.

In one embodiment, the first reference position is a cell where the first node is located.

In one embodiment, the first reference position is a cell where the first node is located at a first instant of time.

In one embodiment, the first reference position is a first reference geographic coordinate.

In one embodiment, the first reference position is a zone determined according to the first reference geographic coordinate.

In one embodiment, the first reference geographic coordinate is Geographical Coordinate (0, 0) defined according to WGS84 model.

In one embodiment, the WGS84 model refers to Military Standard WGS84 Metric MIL-STD-2401 (11 Jan. 1994): "Military Standard Department of Defense World Geodetic System (WGS)".

In one embodiment, the first reference position comprises a first geographic coordinate (x1, y1), where x1 and y1 respectively refer to the longitude and the latitude.

In one embodiment, the first reference position comprises a first geographic coordinate (x1, y1), of which x1 is a longitude distance from the first node to the first reference geographic coordinate and y1 is a latitude distance from the first node to the first reference geographic coordinate.

In one embodiment, the first geographic coordinate (x1, y1) is used for determining the first reference position.

In one embodiment, the first reference position is a geographic coordinate of the first node at a first instant of time.

In one embodiment, the second reference position is a Zone.

In one embodiment, the second reference position is an SL Zone.

In one embodiment, the second reference position is a cell.

In one embodiment, the second reference position is a coverage of a transmission point.

In one embodiment, the second reference position is a geographic zone.

In one embodiment, the second reference position is a geographic position of a transmission point.

In one embodiment, the second reference position is a geographic position of third communication node.

In one embodiment, the second reference position is a geographic position of the first node.

In one embodiment, the second reference position is a geographic position of the first node at a second instant of time.

In one embodiment, the second reference position is a zone where the first node is located.

In one embodiment, the second reference position is a zone where the first node is located at a second instant of time.

In one embodiment, the second reference position is an SL Zone where the first node is located.

In one embodiment, the second reference position is a cell where the first node is located.

In one embodiment, the second reference position is a cell where the first node is located at a second instant of time.

In one embodiment, the second reference position is a zone determined according to the first reference geographic coordinate.

In one embodiment, the second reference position comprises a second geographic coordinate (x1, y1), where x1 and y1 respectively refer to the longitude and the latitude.

In one embodiment, the second reference position comprises a second geographic coordinate (x2, y2), of which x2 is a longitude distance from the first node to the first reference geographic coordinate and y2 is a latitude distance from the first node to the first reference geographic coordinate.

In one embodiment, the second geographic coordinate (x1, y1) is used for determining the first reference position.

In one embodiment, the first reference position is a geographic coordinate of the first node at a second instant of time.

In one embodiment, the first instant of time and the second instant of time are time.

In one embodiment, the first instant of time is earlier than the second instant of time.

In one embodiment, the first reference position and the second reference position are the same.

In one embodiment, the first reference position and the second reference position are different.

In one embodiment, the first reference position and the second reference position are overlapped.

In one embodiment, the first reference position and the second reference position are non-overlapped.

In one embodiment, the first reference position is adjacent to the second reference position.

In one embodiment, the first reference position is not adjacent to the second reference position.

In one embodiment, the second-type signal comprises a higher-layer signaling of the first node.

In one embodiment, the second-type signal is generated by a higher layer of the first node.

In one embodiment, a transmitter of the second-type signal is the first node.

In one embodiment, a transmitter of the second-type signal is a higher layer of the first node.

In one embodiment, the second-type signal is transmitted from an RRC layer of the first node to a MAC layer of the first node, and then to a physical (PHY) layer of the first node.

In one embodiment, a transmitter of the second-type signal is a serving cell of the first node.

In one embodiment, a transmitter of the second-type signal is a serving base station of the first node.

In one embodiment, a transmitter of the second-type signal is a serving satellite of the first node.

In one embodiment, a transmitter of the second-type signal is third communication node.

In one embodiment, the second-type signal is transmitted through a PDCCH.

In one embodiment, the second-type signal is transmitted through a PDSCH.

In one embodiment, the second-type signal is transmitted through a PDCCH and a PDSCH.

In one embodiment, the second-type signal is transmitted via broadcast.

In one embodiment, the second-type signal is transmitted via groupcast.

In one embodiment, the second-type signal is transmitted via unicast.

In one embodiment, the second-type signal is cell-specific.

In one embodiment, the second-type signal is UE-specific.

In one embodiment, the first-type signal comprises one or more fields in a PHY layer signaling.

In one embodiment, the first-type signal comprises one or more fields in a piece of SCI.

In one embodiment, the first-type signal comprises one or more fields in a piece of DCI.

In one embodiment, the first-type signal comprises all or part of a MAC layer signaling.

In one embodiment, the first-type signal comprises one or more fields in a MAC CE.

In one embodiment, the first-type signal comprises all or part of a higher-layer signaling.

In one embodiment, the first-type signal comprises all or part of an RRC layer signaling.

In one embodiment, the first-type signal comprises one or more fields in an RRC IE.

In one embodiment, the first-type signal belongs to a System Information Block (SIB).

In one embodiment, the first-type signal belongs to a piece of pre-configuration information.

In one embodiment, the first-type signal is zoneConfig; for the zoneConfig, refer to 3GPP TS36.211, section 5.10.13.2.

In one embodiment, the first-type signal comprises a Zone Identity (ID).

In one embodiment, the first-type signal comprises a Geographic Zone ID.

In one embodiment, the first-type signal comprises a Cell ID.

In one embodiment, the first-type signal comprises a Transmission Point Identity (TP ID).

In one embodiment, the first-type signal comprises SL Zone Configurations.

In one embodiment, the first-type signal indicates the configuration of the first reference position.

In one embodiment, the first-type signal comprises Zone Length of the first reference position.

In one embodiment, the first-type signal comprises Zone Width of the first reference position.

In one embodiment, the first-type signal comprises the longitude of the first reference position.

In one embodiment, the first-type signal comprises the latitude of the first reference position.

In one embodiment, the first-type signal comprises a total number of zones on a same longitude.

In one embodiment, the first-type signal comprises a total number of zones on a same latitude.

In one embodiment, the first node determines one of the two reference positions based on the second-type signal.

In one embodiment, the first node determines the other of the two reference positions based on the reference position and a speed and direction of mobility of the first node.

In one embodiment, the second-type signal comprises two second-type sub-signals, and the first node determines the two reference positions respectively according to the two second-type sub-signals.

In one embodiment, the first-type signal comprises the first reference position.

In one embodiment, the first node determines the second reference position according to a speed of mobility and a moving direction of the first node.

In one embodiment, the first reference position and a speed of mobility and a moving direction of the first node are used for determining the second reference position.

In one embodiment, a distance between the second reference position and the first reference position is equal to a product of a speed of mobility of the first node and a first time difference, the first time difference is a difference between the second instant of time and the first instant of time.

In one embodiment, the second reference position lies in the moving direction of the first node.

In one embodiment, the first-type signal comprises a geographic position of the first node at the first instant of time.

In one embodiment, the first-type signal comprises a first sub-signal and a second sub-signal, of which the first sub-signal comprises the first reference position and the second sub-signal comprises the second reference position.

In one embodiment, the first sub-signal comprises a geographic position of the first node at the first instant of time, while the second sub-signal comprises a geographic position of the first node at the second instant of time.

Embodiment 10

Figure 10:
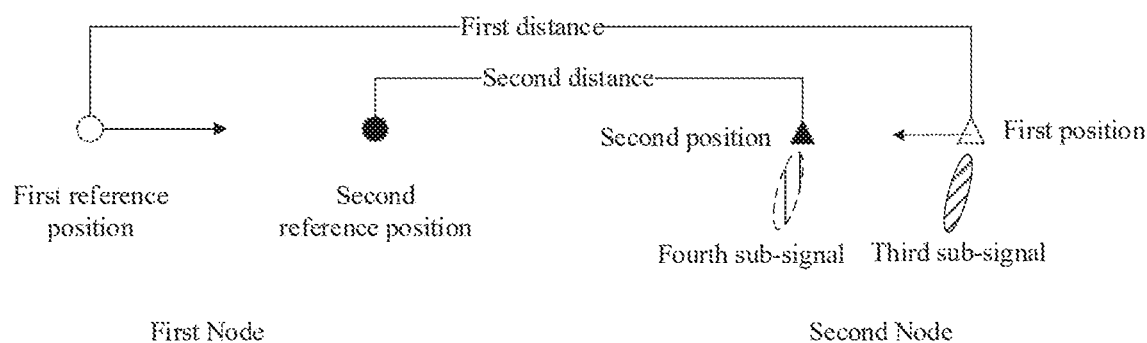
FIG. 10 illustrates a schematic diagram of relations among two first-type signals, two positions, two distances and two reference positions according to one embodiment of the present disclosure.
Figure 10:
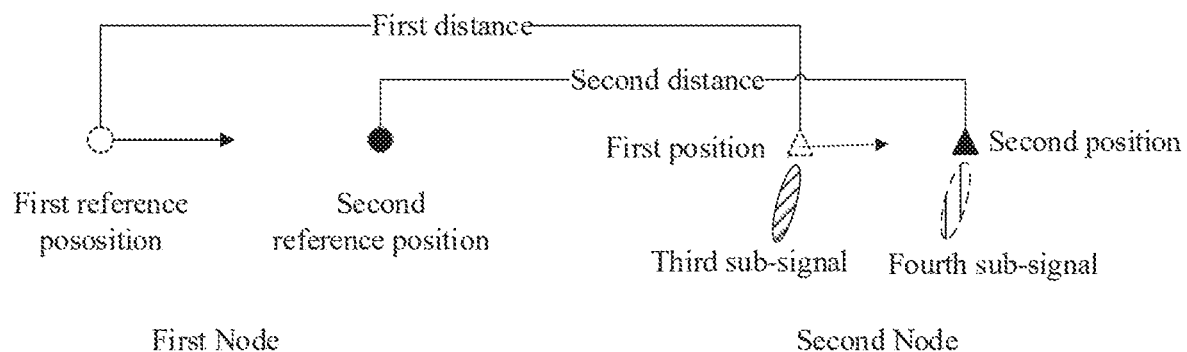

Embodiment 10 illustrates a schematic diagram of relations among two first-type signals, two positions, two distances and two reference positions according to one embodiment of the present disclosure. In FIG. 10, the blank dotted circle represents a first reference position, while the solid circle represents a second reference position. The blank triangle represents a first position, while the filled triangle represents a second position. The slash-filled ellipsis formed with solid curve represents a third sub-signal, while the dotted ellipsis filled with vertical lines represents a fourth sub-signal. The solid arrow represents a speed of mobility and a moving direction of the first node, while the dotted arrow represents a speed of mobility and a moving direction of the second node. In Case A illustrated by FIG. 10, the first node and the second node move towards each other; in Case B, the first node and the second node move in the same direction.

In Embodiment 10, the two first-type signals are a third sub-signal and a fourth sub-signal, respectively; the two positions are a first position and a second position, respectively; the third sub-signal indicates the first position and the fourth sub-signal indicates the second position; the two distances are a first distance and a second distance, respectively; the first distance is a distance from the first position to the first reference position, while the second distance is a distance from the second position to the second reference position; the first speed is related to a difference between the first distance and the second distance, the first speed is a speed of mobility of the first node, and the speed of mobility of the first node is a speed of mobility between the first node and a transmitter of the first signal.

In one embodiment, the two distances are a first position and a second position.

In one embodiment, the first position is a Zone.

In one embodiment, the first position is an SL Zone.

In one embodiment, the first position is a Cell.

In one embodiment, the first position is a coverage of a transmission point.

In one embodiment, the first position is a geographic zone.

In one embodiment, the first position is a geographic position of a transmission point.

In one embodiment, the first position is a geographic position of the second node.

In one embodiment, the first position is a geographic position of the second node at a first instant of time.

In one embodiment, the first position is a zone where the second node is located.

In one embodiment, the first position is a zone where the second node is located at a first instant of time.

In one embodiment, the first position is an SL Zone where the second node is located.

In one embodiment, the first position is a cell where the second node is located.

In one embodiment, the first position is a cell where the second node is located at a first instant of time.

In one embodiment, the first position is a zone determined according to the first reference geographic coordinate.

In one embodiment, the first position is a geographic position determined according to the first reference geographic coordinate.

In one embodiment, the first position comprises a third geographic coordinate (x3, y3), where x3 and y3 respectively refer to the longitude and the latitude.

In one embodiment, the first position comprises a third geographic coordinate (x3, y3), of which x3 is a longitude distance from the second node to the first reference geographic coordinate and y3 is a latitude distance from the second node to the first reference geographic coordinate.

In one embodiment, the third geographic coordinate (x3, y3) is used for determining the first position.

In one embodiment, the first position is a geographic coordinate of the second node at a first instant of time.

In one embodiment, the second position is a Zone.

In one embodiment, the second position is an SL Zone.

In one embodiment, the second position is a Cell.

In one embodiment, the second position is a coverage of a transmission point.

In one embodiment, the second position is a geographic zone.

In one embodiment, the second position is a geographic position of a transmission point.

In one embodiment, the second position is a geographic position of the second node.

In one embodiment, the second position is a geographic position of the second node at a second instant of time.

In one embodiment, the second position is a zone where the second node is located.

In one embodiment, the second position is a zone where the second node is located at a second instant of time.

In one embodiment, the second position is an SL Zone where the second node is located.

In one embodiment, the second position is a cell where the second node is located.

In one embodiment, the second position is a cell where the second node is located at a second instant of time.

In one embodiment, the second position is a zone determined according to the first reference geographic coordinate.

In one embodiment, the second position comprises a fourth geographic coordinate (x4, y4), where x4 and y4 respectively refer to the longitude and the latitude.

In one embodiment, the second position comprises a fourth geographic coordinate (x4, y4), of which x4 is a longitude distance from the second node to the first reference geographic coordinate and y4 is a latitude distance from the second node to the first reference geographic coordinate.

In one embodiment, the fourth geographic coordinate (x4, y4) is used for determining the second position.

In one embodiment, the second position is a geographic coordinate of the second node at a second instant of time.

In one embodiment, the first position is the same as the second position.

In one embodiment, the first position is difference from the second position.

In one embodiment, the first position is overlapped with the second position.

In one embodiment, the first position and the second position are non-overlapped.

In one embodiment, the first position is adjacent to the second position.

In one embodiment, the first position is not adjacent to the second position.

In one embodiment, the two distances comprise a first distance and a second distance.

In one embodiment, the first distance is a distance between the first position and the first reference position.

In one embodiment, the second distance is a distance between the second position and the second reference position.

In one embodiment, the first distance is a geographic distance between the first position and the first reference position.

In one embodiment, the second distance is a geographic distance between the second position and the second reference position.

In one embodiment, the first distance is a closest distance between the first position and the first reference position.

In one embodiment, the first distance is a closest distance between the second position and the second reference position.

In one embodiment, the first distance is a farthest distance between the first position and the first reference position.

In one embodiment, the first distance is a farthest distance between the second position and the second reference position.

In one embodiment, the first distance is a distance between the first node and the second node at the first instant of time.

In one embodiment, the second distance is a distance between the first node and the second node at the second instant of time.

In one embodiment, a difference between the two distances refers to a difference between the first distance and the second distance.

In one embodiment, a difference between the first distance and the second distance is a positive number.

In one embodiment, a difference between the first distance and the second distance is a complex number.

In one embodiment, a difference between the two distances refers to an absolute value of a difference between the first distance and the second distance.

In one embodiment, the first speed is linear with a difference between the two distances.

In one embodiment, the first speed is proportional to a difference between the two distances.

In one embodiment, the larger a difference between the two distances is, the greater the first speed will be.

In one embodiment, the first speed gets higher as the difference between the two distances increases.

In one embodiment, the first speed is inversely proportional to a difference between the two distances.

In one embodiment, the larger a difference between the two distances is, the smaller the first speed will be.

In one embodiment, the first speed gets lower as the difference between the two distances increases.

In one embodiment, the difference between the two distances is equal to a product of the first speed and the difference between the second instant of time and the first instant of time.

In one embodiment, the two first-type signals are two higher-layer signalings, respectively.

In one embodiment, at least one of the two first-type signals is a higher-layer signaling.

In one embodiment, the two first-type signals are two fields in a higher-layer signaling.

In one embodiment, at least one of the two first-type signals is a field in a higher-layer signaling.

In one embodiment, at least one of the two first-type signals comprises all or part of an RRC layer signaling.

In one embodiment, at least one of the two first-type signals comprises one or more fields in an RRC IE.

In one embodiment, the two first-type signals are two RSs respectively.

In one embodiment, at least one of the two first-type signals is an RS.

In one embodiment, the two first-type signals are two CSI-RSs respectively.

In one embodiment, at least one of the two first-type signals is a CSI-RS.

In one embodiment, at least one of the two first-type signals is generated by a pseudo-random sequence.

In one embodiment, at least one of the two first-type signals is generated by a Gold sequence.

In one embodiment, at least one of the two first-type signals is generated by a M-sequence.

In one embodiment, at least one of the two first-type signals is generated by a Zadeoff-Chu sequence.

In one embodiment, the two first-type signals comprise a third sub-signal and a fourth sub-signal.

In one embodiment, the third sub-signal is used for determining the first position.

In one embodiment, the fourth sub-signal is used for determining the second position.

In one embodiment, the third sub-signal is transmitted at the first instant of time.

In one embodiment, the fourth sub-signal is transmitted at the second instant of time.

In one embodiment, the two first-type signals respectively comprise two positions.

In one embodiment, the third sub-signal comprises the first position.

In one embodiment, the fourth sub-signal comprises the second position.

In one embodiment, incident angles of the two first-type signals are respectively used for determining the two positions.

In one embodiment, an incident angle of the third sub-signal is used for determining the first position.

In one embodiment, an incident angle of the fourth sub-signal is used for determining the second position.

In one embodiment, receiving delays of the two first-type signals are respectively used for determining the two positions.

In one embodiment, a receiving delay of the third sub-signal is used for determining the first position.

In one embodiment, a receiving delay of the fourth sub-signal is used for determining the second position.

In one embodiment, the receiving delay is a delay of the receiving time relative to a reference time.

In one embodiment, a transmitter of the two first-type signals is a transmitter of the first signal.

In one embodiment, a transmitter of the two first-type signals and a transmitter of the first signal are co-located.

In one embodiment, a transmitter of the two first-type signals and a transmitter of the first signal are the same communication node.

In one embodiment, a transmitter of the two first-type signals and a transmitter of the first signal are the same UE.

In one embodiment, a backhaul link between a transmitter of the two first-type signals and a transmitter of the first signal is ideal (i.e., delay is non negligible).

In one embodiment, a transmitter of the two first-type signals and a transmitter of the first signal share a same set of baseband equipment.

Embodiment 11

Figure 11:
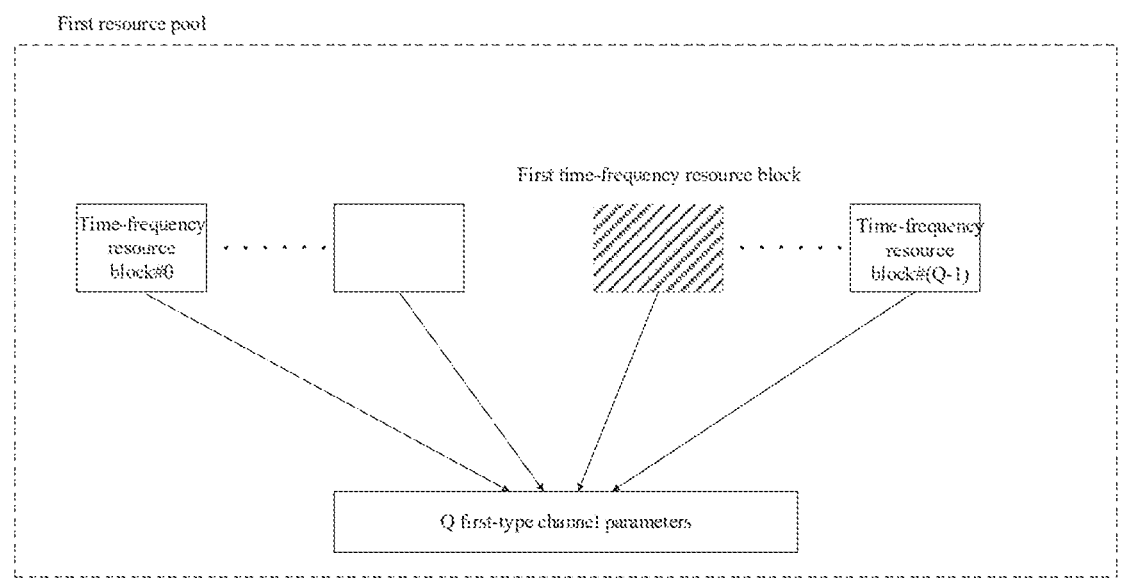
FIG. 11 illustrates a schematic diagram of relations among a first resource pool, a first time-frequency resource block and Q time-frequency resource blocks according to one embodiment of the present disclosure.

Embodiment 11 illustrates a schematic diagram of relations among a first resource pool, a first time-frequency resource block and Q time-frequency resource blocks according to one embodiment of the present disclosure, as shown in FIG. 11. In FIG. 11, the large square framed with dotted lines represents a first resource pool, the smaller square framed with solid lines represents Q time-frequency resource blocks, and the slash-filled box represents a first time-frequency resource block.

In Embodiment 11, Q second-type channel parameters are respectively measured for Q time-frequency resource blocks, Q being a positive integer greater than 1; the first time-frequency resource block is one of the Q time-frequency resource blocks; and a second-type channel parameter measured for the first time-frequency resource block is a smallest value among the Q second-type channel parameters.

In one embodiment, the Q time-frequency resource blocks all belong to the first resource pool, and the first time-frequency resource block is one of the Q time-frequency resource blocks.

In one embodiment, a second channel parameter is measured for the first time-frequency resource block, and the second channel parameter is one of the Q second-type channel parameters.

In one embodiment, the Q time-frequency resource blocks respectively correspond to the Q second-type channel parameters.

In one embodiment, any of the Q second-type channel parameters is an average power of all signals received on one of Q time-frequency resource blocks.

In one embodiment, any of the Q second-type channel parameters is an average power of RSs received on one of Q time-frequency resource blocks.

In one embodiment, any of the Q second-type channel parameters is an average power of SSs received on one of Q time-frequency resource blocks.

In one embodiment, the Q second-type channel parameters are respectively Q Received Signal Strength Indicators (RSSIs).

In one embodiment, the Q second-type channel parameters are respectively Q Sidelink Received Signal Strength Indicators (SL-RSSIs).

In one embodiment, the Q second-type channel parameters are respectively Q RSRPs.

In one embodiment, the Q second-type channel parameters are respectively Q L1-RSRPs.

In one embodiment, the Q second-type channel parameters are respectively Q SL-RSRPs.

Embodiment 12

Figure 12:
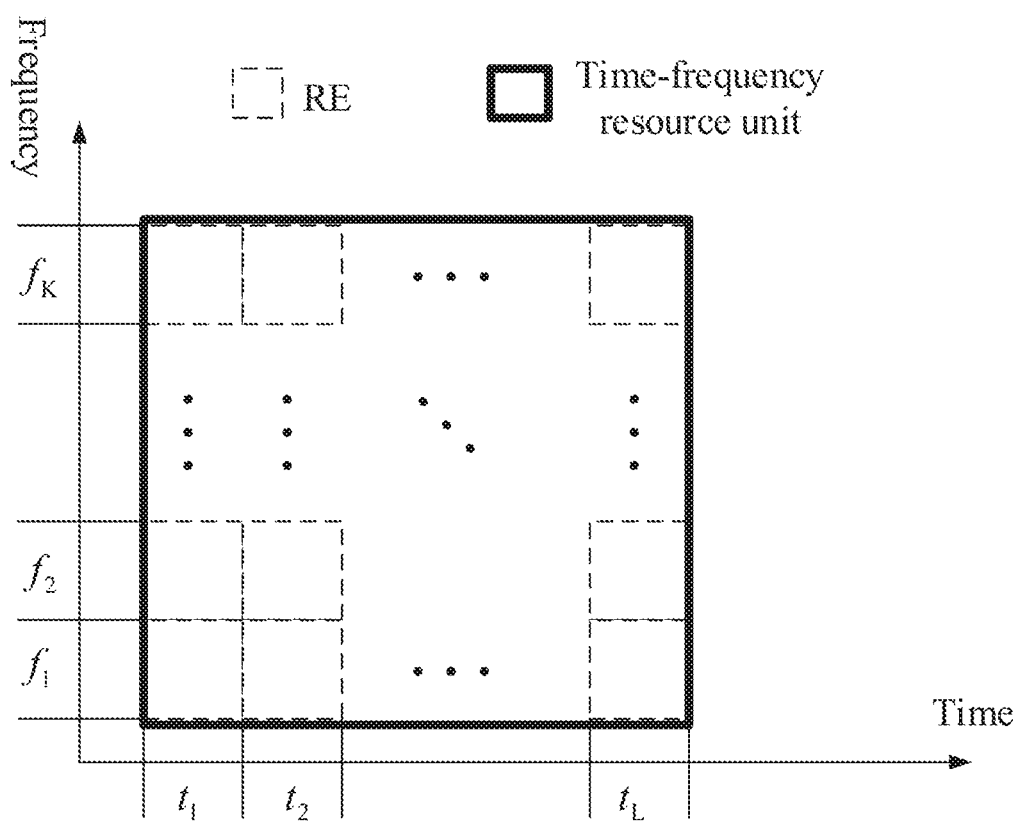
FIG. 12 illustrates a schematic diagram of a time-frequency resource unit according to one embodiment of the present disclosure.

Embodiment 12 illustrates a schematic diagram of a time-frequency resource unit according to one embodiment of the present disclosure, as shown in FIG. 12. In FIG. 12, each dotted box represents a RE, the large box framed with thick lines represents a time-frequency resource unit. In FIG. 12, a time-frequency resource block occupies K subcarriers in frequency domain and L multicarrier symbol(s) in time domain, K and L being positive integers. In FIGS. 12, $t_1$, $t_2 \ldots$, and $t_L$, represent L Symbols, while $f_1$, $f_2 \ldots$, and $f_K$ represent K Subcarriers.

In Embodiment 12, a time-frequency resource block occupies the K subcarriers in frequency domain and the L multicarrier symbol(s) in time domain, K and L being positive integers.

In one embodiment, the K is equal to 12.

In one embodiment, the K is equal to 72.

In one embodiment, the K is equal to 127.

In one embodiment, the K is equal to 240.

In one embodiment, the L is equal to 1.

In one embodiment, the L is equal to 2.

In one embodiment, the L is no greater than 14.

In one embodiment, any of the L multicarrier symbol(s) is a Frequency Division Multiple Access (FDMA) symbol.

In one embodiment, any of the L multicarrier symbol(s) is an Orthogonal Frequency Division Multiplexing (OFDM) symbol.

In one embodiment, any of the L multicarrier symbol(s) is a Single-Carrier Frequency Division Multiple Access (SC-FDMA) symbol.

In one embodiment, any of the L multicarrier symbol(s) is a Discrete Fourier Transform Spread Orthogonal Frequency Division Multiplexing (DFT-S-OFDM) symbol.

In one embodiment, any of the L multicarrier symbol(s) is a Filter Bank Multi-Carrier (FBMC) symbol.

In one embodiment, any of the L multicarrier symbol(s) is an Interleaved Frequency Division Multiple Access (IF-DMA) symbol.

In one embodiment, the time-domain resource unit comprises a positive integer number of Radio Frame(s).

In one embodiment, the time-domain resource unit comprises a positive integer number of Subframe(s).

In one embodiment, the time-domain resource unit comprises a positive integer number of Slot(s).

In one embodiment, the time-domain resource unit is a slot.

In one embodiment, the time-domain resource unit comprises a positive integer number of multicarrier symbol(s).

In one embodiment, the frequency-domain resource unit comprises a positive integer number of Carrier(s).

In one embodiment, the frequency-domain resource unit comprises a positive integer number of Bandwidth Part(s) (BWP).

In one embodiment, the frequency-domain resource unit is a BWP.

In one embodiment, the frequency-domain resource unit comprises a positive integer number of Subchannel(s).

In one embodiment, the frequency-domain resource unit is a subchannel.

In one embodiment, any of the positive integer number of subchannel(s) comprises a positive integer number of Resource Block(s) (RB).

In one embodiment, the sub-channel comprises a positive integer number of RB(s).

In one embodiment, any of the positive integer number of RB(s) comprises a positive integer number of subcarrier(s) in frequency domain.

In one embodiment, any of the positive integer number of RB(s) comprises 12 subcarriers in frequency domain.

In one embodiment, the sub-channel comprises a positive integer number of Physical Resource Block(s) (PRB).

In one embodiment, the number of PRBs comprised in the subchannel is variable.

In one embodiment, any of the positive integer number of PRB(s) comprises a positive integer number of subcarrier(s) in frequency domain.

In one embodiment, any of the positive integer number of PRB(s) comprises 12 subcarriers in frequency domain.

In one embodiment, the frequency-domain resource unit comprises a positive integer number of RB(s).

In one embodiment, the frequency-domain resource unit is an RB.

In one embodiment, the frequency-domain resource unit comprises a positive integer number of PRB(s).

In one embodiment, the frequency-domain resource unit is a PRB.

In one embodiment, the frequency-domain resource unit comprises a positive integer number of subcarrier(s).

In one embodiment, the frequency-domain resource unit is a subcarrier.

In one embodiment, the time-frequency resource unit comprises the time-domain resource unit.

In one embodiment, the time-frequency resource unit comprises the frequency-domain resource unit.

In one embodiment, the time-frequency resource unit comprises the time-domain resource unit and the frequency-domain resource unit.

In one embodiment, the time-frequency resource unit comprises R RE(s), R being a positive integer.

In one embodiment, the time-frequency resource unit is composed of R RE(s), R being a positive integer.

In one embodiment, any of the R RE(s) occupies a multicarrier symbol in time domain and a subcarrier in frequency domain.

In one embodiment, the subcarrier spacing is measured by Hertz (Hz).

In one embodiment, the subcarrier spacing is measured by Kilohertz (kHz).

In one embodiment, the subcarrier spacing is measured by Megahertz (MHz).

In one embodiment, the length of the multicarrier symbol is measured by sampling point.

In one embodiment, the length of the multicarrier symbol is measured by µs.

In one embodiment, the length of the multicarrier symbol is measured by ms.

In one embodiment, the subcarrier spacing at least is one of 1.25 kHz, 2.5 kHz, 5 kHz, 15 kHz, 30 kHz, 60 kHz, 120 kHz and 240 kHz.

In one embodiment, the time-frequency resource unit comprises the K subcarriers and the L multicarrier symbol(s), the product of the K and the L is no less than the R.

In one embodiment, the time-frequency resource unit does not comprise any RE allocated to Guard Period (GP).

In one embodiment, the time-frequency resource unit does not comprise any RE allocated to an RS.

In one embodiment, the time-frequency resource unit comprises a positive integer number of RB(s).

In one embodiment, the time-frequency resource unit belongs to an RB.

In one embodiment, the time-frequency resource unit is equivalent to an RB in frequency domain.

In one embodiment, the time-frequency resource unit comprises 6 RBs in frequency domain.

In one embodiment, the time-frequency resource unit comprises 20 RBs in frequency domain.

In one embodiment, the time-frequency resource unit comprises a positive integer number of PRB(s).

In one embodiment, the time-frequency resource unit belongs to a PRB.

In one embodiment, the time-frequency resource unit is equivalent to a PRB in frequency domain.

In one embodiment, the time-frequency resource unit comprises a positive integer number of Virtual Resource Block(s) (VRB).

In one embodiment, the time-frequency resource unit belongs to a VRB.

In one embodiment, the time-frequency resource unit is equivalent to a VRB in frequency domain.

In one embodiment, the time-frequency resource unit comprises a positive integer number of Physical Resource Block pair(s) (PRB pair).

In one embodiment, the time-frequency resource unit belongs to PRB pair.

In one embodiment, the time-frequency resource unit is equivalent to a PRB pair in frequency domain.

In one embodiment, the time-frequency resource unit comprises a positive integer number of radio frame(s).

In one embodiment, the time-frequency resource unit belongs to a radio frame.

In one embodiment, the time-frequency resource unit is equivalent to a radio frame in time domain.

In one embodiment, the time-frequency resource unit comprises a positive integer number of subframe(s).

In one embodiment, the time-frequency resource unit belongs to a subframe.

In one embodiment, the time-frequency resource unit is equivalent to a subframe in time domain.

In one embodiment, the time-frequency resource unit comprises a positive integer number of slot(s).

In one embodiment, the time-frequency resource unit belongs to a slot.

In one embodiment, the time-frequency resource unit is equivalent to a slot in time domain.

In one embodiment, the time-frequency resource unit comprises a positive integer number of symbol(s).

In one embodiment, the time-frequency resource unit belongs to a symbol.

In one embodiment, the time-frequency resource unit is equivalent to a symbol in time domain.

In one embodiment, the time-domain resource unit of the present disclosure is of a time duration equal to that of the time-frequency resource unit of the present disclosure in time domain.

In one embodiment, a number of subcarriers occupied by the frequency-domain resource unit of the present disclosure is equal to that of subcarriers occupied by the time-frequency resource unit of the present disclosure in frequency domain.

Embodiment 13

Figure 13:
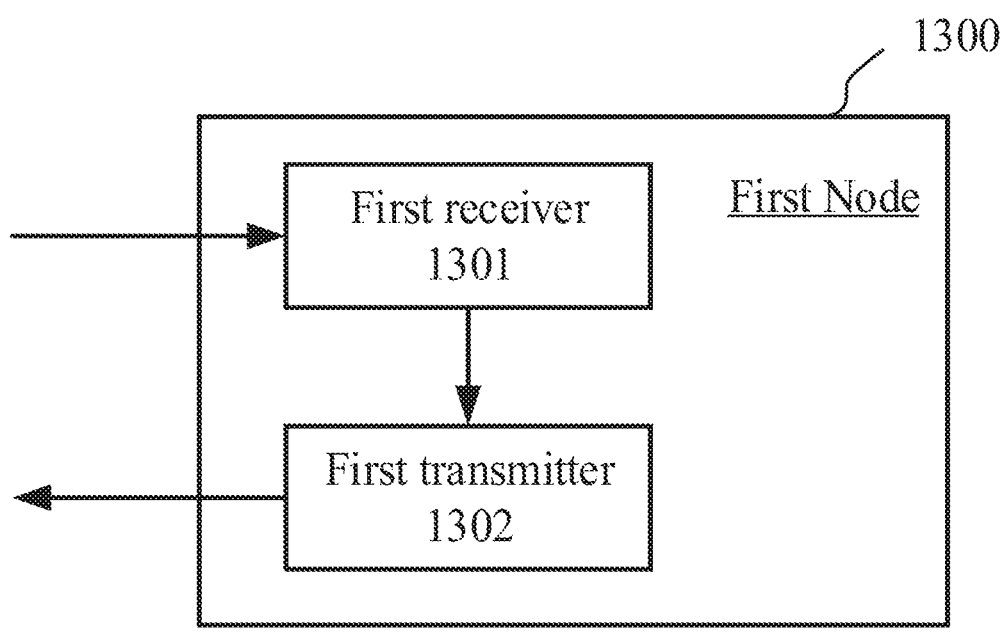
FIG. 13 illustrates a structure block diagram of a processing device in a first node according to one embodiment of the present disclosure.

Embodiment 13 illustrates a structure block diagram of a processing device in a first node, as shown in FIG. 13. In Embodiment 13, a first node processing device 1300 is composed of a first receiver 1301 and a first transmitter 1302.

In one embodiment, the first receiver 1301 comprises at least one of antenna 452, a transmitter/receiver 454, a multi-antenna receiving processor 458, a receiving processor 456, a controller/processor 459, a memory 460 or a data source 467 in FIG. 4 of the present disclosure.

In one embodiment, the first transmitter 1302 comprises at least one of antenna 452, a transmitter/receiver 454, a multi-antenna transmitting processor 457, a transmitting processor 468, a controller/processor 459, a memory 460 or a data source 467 in FIG. 4 of the present disclosure.

In Embodiment 13, the first receiver 1301 receives a first signal so as to determine a first channel quality; the first receiver determines a first speed; the first receiver 1301 determines whether a first resource pool comprises a first time-frequency resource block; the first transmitter 1302 select a target time-frequency resource block from a first resource pool; the first transmitter 1302 transmits a second signal in the target time-frequency resource block; the first speed is a speed of mobility of the first node; the first resource pool comprises multiple time-frequency resource blocks, and whether the first resource pool comprises the first time-frequency resource block is dependent on the first speed.

In one embodiment, the first receiver 1301 receives two first-type signals, the two first-type signals respectively indicate two positions; time-domain resources occupied by the two first-type signals are orthogonal; the first speed is related to a difference between two distances, the speed of mobility of the first node is a speed of mobility between the first node and a transmitter of the first signal; the two distances are respectively distances from the two positions to two reference positions.

In one embodiment, the first receiver 1301 receives a second-type signal, and determines the two reference positions according to the second-type signal; a transmitter of the second-type signal and a transmitter of the first signal are non-co-located.

In one embodiment, when the first channel quality is lower than a first threshold, the first receiver 1301 determines that the first resource pool comprises the first time-frequency resource block; when the first channel quality is higher than a first threshold, the first receiver 1301 determines that the first resource pool does not comprise the first time-frequency resource block; the first threshold is related to the first speed.

In one embodiment, when the first channel quality is lower than a first threshold and the first speed is lower than a second threshold, the first receiver 1301 determines that the first resource pool comprises the first time-frequency resource block; when the first channel quality is not lower than a first threshold or the first speed is not lower than a second threshold, the first receiver 1301 determines that the first resource pool does not comprise the first time-frequency resource block.

In one embodiment, the first receiver 1301 measures Q second-type channel parameters for Q time-frequency resource blocks respectively, Q being a positive integer greater than 1; the first time-frequency resource block is one of the Q time-frequency resource blocks, and a second-type channel parameter measured for the first time-frequency resource block is a smallest value among the Q second-type channel parameters.

In one embodiment, the first node 1300 is a UE.

In one embodiment, the first node 1300 is a relay node.

In one embodiment, the first node 1300 is a base station.

In one embodiment, the first node 1300 is a vehicle-mounted communication equipment.

In one embodiment, the first node 1300 is a UE supporting V2X communications.

In one embodiment, the first node 1300 is a relay node supporting V2X communications.

Embodiment 14

Figure 14:
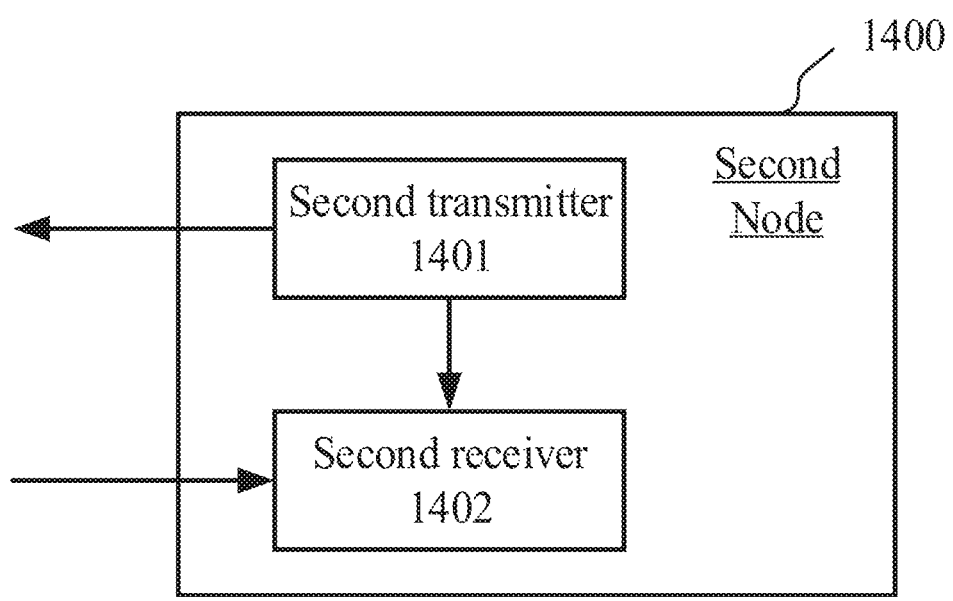
FIG. 14 illustrates a structure block diagram of a processing device in a second node according to one embodiment of the present disclosure.

Embodiment 14 illustrates a structure block diagram of a processing device in a second node, as shown in FIG. 14. In FIG. 14, a second node processing device 1400 is mainly composed of a second transmitter 1401 and a second receiver 1402.

In one embodiment, the second transmitter 1401 comprises at least one of antenna 420, a transmitter/receiver 418, a multi-antenna transmitting processor 471, a transmitting processor 416, a controller/processor 475 or a memory 476 in FIG. 4 of the present disclosure.

In one embodiment, the second receiver 1402 comprises at least one of antenna 420, a transmitter/receiver 418, a multi-antenna receiving processor 472, a receiving processor 470, a controller/processor 475 or a memory 476 in FIG. 4 of the present disclosure.

In Embodiment 14, the second transmitter 1401 transmits a first signal; the second receiver 1402 receives a second signal in the target time-frequency resource block; the first signal is used for determining a first channel quality; a first speed is a speed of mobility of the first node; the first resource pool comprises multiple time-frequency resource blocks, whether the first resource pool comprises a first time-frequency resource block is dependent on the first speed; a target time-frequency resource block is selected from the first resource block.

In one embodiment, the second transmitter 1401 transmits two first-type signals, the two first-type signals respectively indicate two positions; time-domain resources occupied by the two first-type signals are orthogonal; the first speed is related to a difference between two distances, the speed of mobility of the first node is a speed of mobility between the first node and a transmitter of the first signal; the two distances are respectively distances from the two positions to two reference positions.

In one embodiment, the two reference positions are determined according to the second-type signal; a transmitter of the second-type signal and a transmitter of the first signal are non-co-located.

In one embodiment, when the first channel quality is lower than a first threshold, it is determined that the first resource pool comprises the first time-frequency resource block; when the first channel quality is higher than a first threshold, it is determined that the first resource pool does not comprise the first time-frequency resource block; the first threshold is related to the first speed.

In one embodiment, when the first channel quality is lower than a first threshold and the first speed is lower than a second threshold, it is determined that the first resource pool comprises the first time-frequency resource block; when the first channel quality is not lower than a first threshold or the first speed is not lower than a second threshold, it is determined that the first resource pool does not comprise the first time-frequency resource block.

In one embodiment, Q second-type channel parameters are respectively measured for Q time-frequency resource blocks; the first time-frequency resource block is one of the Q time-frequency resource blocks; and a second-type channel parameter measured for the first time-frequency resource block is a smallest value among the Q second-type channel parameters, Q being a positive integer greater than 1.

In one embodiment, the second node 1400 is a UE.

In one embodiment, the second node 1400 is a base station.

In one embodiment, the second node 1400 is a relay node.

In one embodiment, the second node 1400 is a UE supporting V2X communications.

In one embodiment, the second node 1400 is a base station supporting V2X communications.

In one embodiment, the second node 1400 is a relay node supporting V2X communications.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node in the present disclosure includes but is not limited to mobile phones, tablet computers, notebooks, network cards, low-consumption equipment, enhanced MTC (eMTC) equipment, NB-IOT terminals, vehicle-mounted equipment, aircrafts, airplanes, unmanned aerial vehicles, telecontrolled aircrafts, etc. The second node in the present disclosure includes but is not limited to mobile phones, tablet computers, notebooks, network cards, low-consumption equipment, enhanced MTC (eMTC) equipment, NB-IOT terminals, vehicle-mounted equipment, aircrafts, airplanes, unmanned aerial vehicles, telecontrolled aircrafts, etc. The UE or terminal includes but is not limited to mobile phones, tablet computers, notebooks, network cards, low-consumption equipment, enhanced MTC (eMTC) equipment, NB-IOT terminals, vehicle-mounted equipment, aircrafts, airplanes, unmanned aerial vehicles, telecontrolled aircrafts, etc. The base station or network side equipment in the present disclosure includes but is not limited to macro-cellular base stations, micro-cellular base stations, home base stations, relay base station, eNB, gNB, Transmitter Receiver Point (TRP), GNSS, relay satellites, satellite base station, aerial base station, and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first node for wireless communications, comprising:
    receiving a first signal so as to determine a first channel quality;
    determining a first speed;
    determining whether a first resource pool comprises a first time-frequency resource block;
    selecting a target time-frequency resource block from the first resource pool; and
    transmitting a second signal in the target time-frequency resource block;
    wherein the first speed is a speed of mobility of the first node; the first resource pool comprises multiple time-frequency resource blocks, and whether the first resource pool comprises the first time-frequency resource block is dependent on the first speed;
    when the first channel quality is lower than a first threshold, determining that the first resource pool comprises the first time-frequency resource block; when the first channel quality is higher than a first threshold, determining that the first resource pool does not comprise the first time-frequency resource block;
    wherein the first threshold is related to the first speed;
    or, when the first channel quality is lower than a first threshold and the first speed is lower than a second threshold, determining that the first resource pool comprises the first time-frequency resource block; when the first channel quality is not lower than a first threshold or the first speed is not lower than a second threshold, determining that the first resource pool does not comprise the first time-frequency resource block.

2. The method according to claim 1, comprising:
    receiving two first-type signals, and the two first-type signals respectively indicating two positions;
    wherein time-domain resources occupied by the two first-type signals are orthogonal; the first speed is related to a difference between two distances, the speed of mobility of the first node is a speed of mobility between the first node and a transmitter of the first signal; the two distances are respectively distances from the two positions to two reference positions.

3. The method according to claim 2, comprising:
    receiving a second-type signal, and determining the two reference positions according to the second-type signal;
    wherein a transmitter of the second-type signal and the transmitter of the first signal are non-co-located.

4. The method according to claim 1, comprising:
    measuring Q second-type channel parameters for Q time-frequency resource blocks respectively, Q being a positive integer greater than 1;
    wherein the first time-frequency resource block is one of the Q time-frequency resource blocks, and a second-type channel parameter measured for the first time-frequency resource block is a smallest value among the Q second-type channel parameters.

5. A method in a second node for wireless communications, comprising:
    transmitting a first signal;
    wherein the first signal is used for determining a first channel quality; a first speed is a speed of mobility of the first node; a first resource pool comprises multiple time-frequency resource blocks, and whether the first resource pool comprises a first time-frequency resource block is dependent on the first speed; a target time-frequency resource block is selected from the first resource pool; the target time-frequency resource block is used for transmitting a second signal;

when the first channel quality is lower than a first threshold, it is determined that the first resource pool comprises the first time-frequency resource block; when the first channel quality is higher than a first threshold, it is determined that the first resource pool does not comprise the first time-frequency resource block; the first threshold is related to the first speed;

or, when the first channel quality is lower than a first threshold and the first speed is lower than a second threshold, it is determined that the first resource pool comprises the first time-frequency resource block; when the first channel quality is not lower than a first threshold or the first speed is not lower than a second threshold, it is determined that the first resource pool does not comprise the first time-frequency resource block.

6. The method according to claim 5, comprising:
transmitting two first-type signals, and the two first-type signals respectively indicating two positions;
wherein time-domain resources occupied by the two first-type signals are orthogonal; the first speed is related to a difference between two distances, the speed of mobility of the first node is a speed of mobility between the first node and a transmitter of the first signal; the two distances are respectively distances from the two positions to two reference positions.

7. The method according to claim 6, wherein a second-type signal is used for determining the two reference positions; a transmitter of the second-type signal and the transmitter of the first signal are non-co-located.

8. The method according to claim 5, wherein Q second-type channel parameters are respectively measured for Q time-frequency resource blocks; the first time-frequency resource block is one of the Q time-frequency resource blocks; and a second-type channel parameter measured for the first time-frequency resource block is a smallest value among the Q second-type channel parameters, Q being a positive integer greater than 1.

9. A first node for wireless communications, comprising:
a first receiver, receiving a first signal so as to determine a first channel quality;
wherein the first receiver determines a first speed;
and the first receiver determines whether a first resource pool comprises a first time-frequency resource block;
a first transmitter, selecting a target time-frequency resource block from a first resource pool;
wherein the first transmitter transmits a second signal in the target time-frequency resource block;
wherein the first speed is a speed of mobility of the first node; the first resource pool comprises multiple time-frequency resource blocks, and whether the first resource pool comprises the first time-frequency resource block is dependent on the first speed;
when the first channel quality is lower than a first threshold, the first receiver determines that the first resource pool comprises the first time-frequency resource block; when the first channel quality is higher than a first threshold, the first receiver determines that the first resource pool does not comprise the first time-frequency resource block;
wherein the first threshold is related to the first speed;
or, when the first channel quality is lower than a first threshold and the first speed is lower than a second threshold, the first receiver determines that the first resource pool comprises the first time-frequency resource block; when the first channel quality is not lower than a first threshold or the first speed is not lower than a second threshold, the first receiver determines that the first resource pool does not comprise the first time-frequency resource block.

10. The first node according to claim 9, comprising:
the first receiver, receiving two first-type signals, and the two first-type signals respectively indicating two positions;
wherein time-domain resources occupied by the two first-type signals are orthogonal; the first speed is related to a difference between two distances, the speed of mobility of the first node is a speed of mobility between the first node and a transmitter of the first signal; the two distances are respectively distances from the two positions to two reference positions.

11. The first node according to claim 10, comprising:
the first receiver, receiving a second-type signal, and determining the two reference positions according to the second-type signal;
wherein a transmitter of the second-type signal and the transmitter of the first signal are non-co-located.

12. The first node according to claim 9, comprising:
the first receiver, measuring Q second-type channel parameters for Q time-frequency resource blocks respectively, Q being a positive integer greater than 1;
wherein the first time-frequency resource block is one of the Q time-frequency resource blocks, and a second-type channel parameter measured for the first time-frequency resource block is a smallest value among the Q second-type channel parameters.

13. A second node for wireless communications, comprising:
a second transmitter, transmitting a first signal;
wherein the first signal is used for determining a first channel quality; a first speed is a speed of mobility of the first node; a first resource pool comprises multiple time-frequency resource blocks, and whether the first resource pool comprises a first time-frequency resource block is dependent on the first speed; a target time-frequency resource block is selected from the first resource pool; the target time-frequency resource block is used for transmitting a second signal;

when the first channel quality is lower than a first threshold, it is determined that the first resource pool comprises the first time-frequency resource block; when the first channel quality is higher than a first threshold, it is determined that the first resource pool does not comprise the first time-frequency resource block; the first threshold is related to the first speed;

or, when the first channel quality is lower than a first threshold and the first speed is lower than a second threshold, it is determined that the first resource pool comprises the first time-frequency resource block; when the first channel quality is not lower than a first threshold or the first speed is not lower than a second threshold, it is determined that the first resource pool does not comprise the first time-frequency resource block.

14. The second node according to claim 13, comprising:
the second transmitter, transmitting two first-type signals, and the two first-type signals respectively indicating two positions;
wherein time-domain resources occupied by the two first-type signals are orthogonal; the first speed is related to a difference between two distances, the speed of mobility of the first node is a speed of mobility between the first node and a transmitter of the first signal; the two distances are respectively distances from the two positions to two reference positions.

15. The second node according to claim 14, wherein a second-type signal is used for determining the two reference positions; a transmitter of the second-type signal and the transmitter of the first signal are non-co-located.

16. The second node according to claim 13, wherein Q second-type channel parameters are respectively measured for Q time-frequency resource blocks; the first time-frequency resource block is one of the Q time-frequency resource blocks; and a second-type channel parameter measured for the first time-frequency resource block is a smallest value among the Q second-type channel parameters, Q being a positive integer greater than 1.

\* \* \* \* \*